(12) United States Patent
Thodi et al.

(10) Patent No.: US 12,476,620 B2
(45) Date of Patent: Nov. 18, 2025

(54) ADAPTIVE CLOCK GENERATOR CIRCUIT

(71) Applicant: TEXAS INSTRUMENTS INCORPORATED, Dallas, TX (US)

(72) Inventors: Diljith Thodi, Bengaluru (IN); Saikiran Kurba, Bengaluru (IN); Uttam Agarwal, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 165 days.

(21) Appl. No.: 18/067,624

(22) Filed: Dec. 16, 2022

(65) Prior Publication Data

US 2024/0204755 A1 Jun. 20, 2024

(51) Int. Cl.
| | |
|---|---|
| H03K 3/012 | (2006.01) |
| G06F 1/08 | (2006.01) |
| G06F 1/12 | (2006.01) |
| H03L 7/08 | (2006.01) |

(52) U.S. Cl.
CPC ............... *H03K 3/012* (2013.01); *G06F 1/08* (2013.01); *G06F 1/12* (2013.01); *H03L 7/08* (2013.01)

(58) Field of Classification Search
CPC ........ H03K 3/012; H03K 23/00; H03K 5/135; H03K 3/0315; G06F 1/08; G06F 1/12; G06F 1/06; G06F 1/10; G06F 1/04; G06F 1/025; G06F 1/14; G06F 1/324; G06F 1/32; G06F 11/1604; H03L 7/08; H03L 7/07; H03L 7/183; H03L 7/06; H03L 7/0812; H03L 7/095; H03L 7/235; H03L 7/0818; H03L 7/1976; H03L 7/199; H03L 7/24; H03L 7/0802; H03L 7/085; H03L 7/107; H03L 7/16; H03L 7/18

See application file for complete search history.

(56) References Cited

U.S. PATENT DOCUMENTS

| | | | | |
|---|---|---|---|---|
| 6,636,999 B1 * | 10/2003 | Yamada | ..................... | G06F 1/12 713/401 |
| 11,545,981 B1 * | 1/2023 | Xanthopoulos | ........... | G06F 1/10 |
| 2003/0076183 A1 * | 4/2003 | Tam | ........................... | H03L 7/06 331/100 |
| 2004/0113668 A1 * | 6/2004 | Gaskins | ..................... | G06F 1/10 327/158 |
| 2012/0161833 A1 * | 6/2012 | Yoshida | .................... | H03L 7/14 327/156 |

* cited by examiner

*Primary Examiner* — John W Poos
(74) *Attorney, Agent, or Firm* — Mandy Barsilai Fernandez; Frank D. Cimino

(57) ABSTRACT

A circuit includes: digital circuits having respective clock inputs; and adaptive clock generator circuitry having clock outputs. Each respective clock input is coupled to one of the generator clock outputs. The adaptive clock generator circuitry includes: a processor having an input interface and an output interface; and clock generator resources having a control input, a root clock input and resource clock outputs. The processor is configured to provide resource configuration parameters at the output interface in response to clock settings received at the input interface and target settings. The control input is coupled to the output interface. Each resource clock output of the resource clock outputs is coupled a respective generator clock output of the generator clock outputs. The clock generator resources are configured to provide a respective clock signal at each of the resource clock outputs in response to the resource configuration parameters received at the control input.

20 Claims, 12 Drawing Sheets

ADAPTIVE CLOCK GENERATOR CIRCUIT

BACKGROUND

Some circuits include clocked components such as digital circuits. Depending on the circuit, many different clocks are used. Also, some clocked components can operate at different clock rates. An example circuit with a variety of clocked components is an encoder/decoder (sometimes referred to as a "codec") circuit. An example codec circuit includes: analog-to-digital converters (ADCs); digital filters; communication interfaces; and digital-to-analog converters (DACs). Some codecs support a wide range of sample rates (e.g., 3 kHz-768 kHz) and have configurable settings (e.g., various power-performance tradeoff settings, rate converter algorithm options, voice activity detection options, limiters, ADC channel options, DAC channel options, and post-processing blocks). Generating clocks for different sample rate options and/or configurable settings, many of which may not be used, is expensive and power consuming.

SUMMARY

In an example, a circuit: digital circuits and adaptive clock generator circuitry. Each digital circuit of the digital circuits has a respective clock input. The adaptive clock generator circuitry has generator clock outputs. Each respective clock input is coupled to one of the generator clock outputs. The adaptive clock generator circuitry includes a processor having an input interface and an output interface. The processor is configured to provide resource configuration parameters at the output interface in response to clock settings received at the input interface and target settings. The adaptive clock generator circuitry also includes clock generator resources having a control input, a root clock input and resource clock outputs. The control input is coupled to the output interface. Each resource clock output of the resource clock outputs is coupled to a respective generator clock output of the generator clock outputs. The clock generator resources are configured to provide a respective clock signal at each of the resource clock outputs in response to the resource configuration parameters received at the control input.

In another example, a codec circuit: clocked components including a processor; and clock generator resources coupled to the processor. The clock generator resources are configured to generate clock signals for the clock components responsive to resource configuration parameters. The processor is configured to: receive clock settings and target settings; and execute a clock tree search algorithm to determine the resource configuration parameters. The clock tree search algorithm is responsive to the clock settings and the target settings.

In another example, a method: obtaining, by adaptive clock generator circuitry, interface clock settings; obtaining, by the adaptive clock generator circuitry, root clock settings; obtaining, by the adaptive clock generator circuitry, target settings; determining, by the adaptive clock generator circuitry, resource configuration parameters responsive to the interface clock settings, the root clock settings, and the target settings; and generating, by the adaptive clock generator circuitry, clock signals responsive to the determined resource configuration parameters.

DETAILED DESCRIPTION

Figure 1:
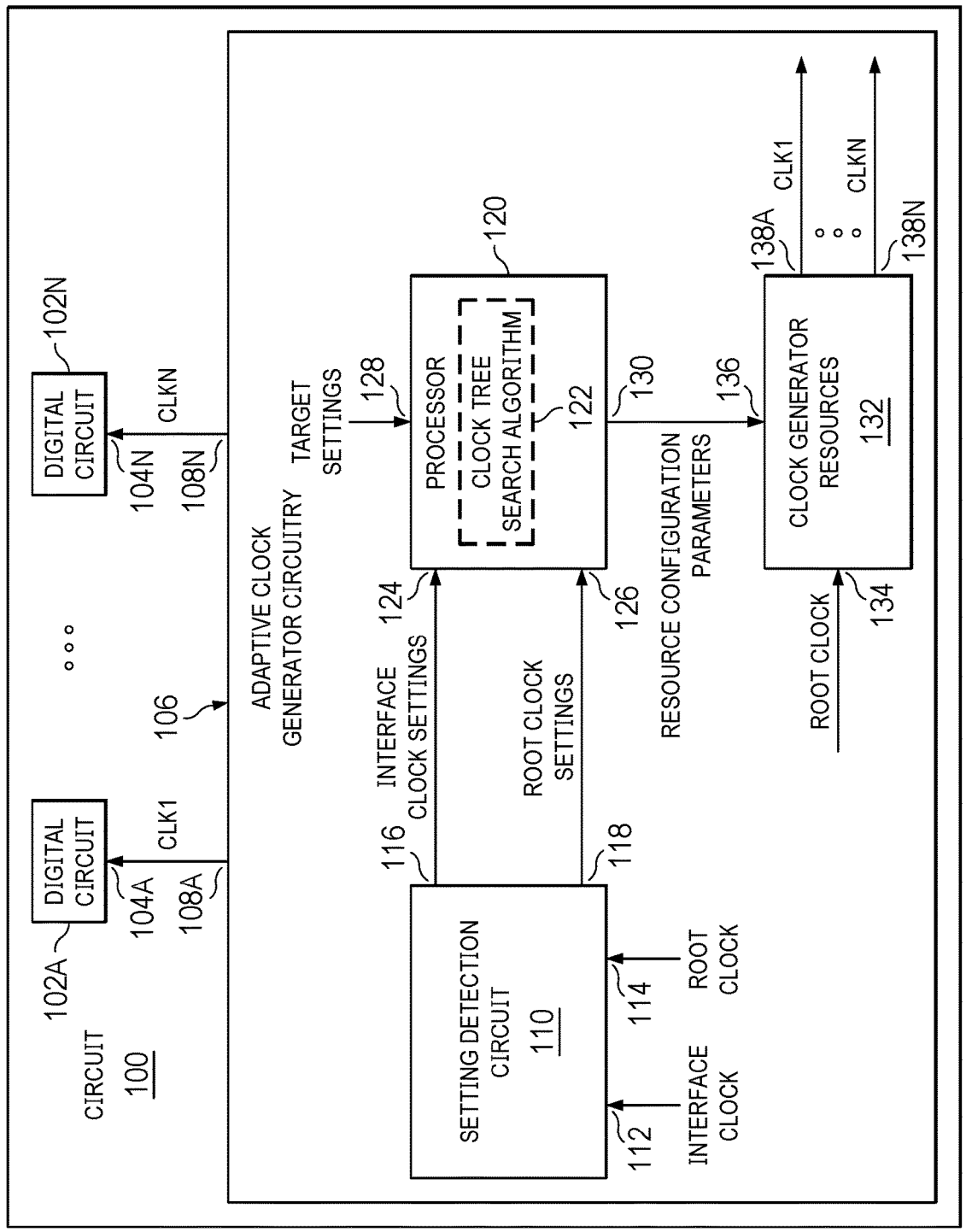
FIG. 1 is a block diagram showing an example circuit.

The same reference numbers or other reference designators are used in the drawings to designate the same or similar features. Such features may be the same or similar either by function and/or structure.

FIG. 1 is a block diagram showing an example circuit 100. Without limitation, the circuit 100 may be an integrated circuit (IC) in some examples. For example, the circuit 100 is an encoder/decoder (codec) circuit or other circuit with clocked components. As shown, the circuit 100 includes digital circuits 102A to 102N and adaptive clock generator circuitry 106.

In a codec circuit example, the digital circuits 102A to 102N may include analog-to-digital converters (ADCs), digital-to-analog converters (DACs), digital signal processors (DSPs), communication interfaces, and/or other components (e.g., a digital microphone). In some examples, the communication interface of a codec circuit is a digital audio serial interface (ASI) configurable as a primary ASI or a secondary ASI. An example DSP of a codec circuit performs digital filtering operations and/or other operations.

In the example of FIG. 1, each of the digital circuits 102A to 102A includes a respective clock input 104A to 104N. The clock signals (e.g., CLK1 to CLKN) provided to the clock inputs 104A to 104N are provided by adaptive clock generator circuitry 106. As shown, the adaptive clock generator circuitry 106 has generator clock outputs 108A to 108N coupled to the respective clock inputs 104A to 104N.

In some examples, the adaptive clock generator circuitry 106 includes a setting detection circuit 110, a processor 120, and clock generator resources 132. The setting detection circuit 110 has a first control input 112, a second control input 114, a first setting output 116, and a second setting output 118. The processor 120 has an input interface (e.g., inputs 124, 126, and 128) and an output interface 130. In operation, the processor 120 provides resource configuration parameters at the output interface 130 in response to clock settings (e.g., interface clock settings and/or root clock settings) received at the input interface and in response to target settings.

Example clock settings include an interface clock frequency, a root clock frequency, a frame sync clock frequency, a root clock to frame sync clock ratio, and/or other clock settings. Example target settings include clock constraints such as modulation clock constraints (e.g., continuous-time sigma-delta modulator clock constraints), dynamic-element matching (DEM) clock constraints, a phase-locked loop (PLL) input clock constraint, a PLL output clock constraint, an integer/fractional PLL mode setting, and/or other clock constraints.

In some examples, the setting detection circuit 110 is operates to: receive a first control signal at the first control input 112; receive a second control signal at the second control input 114; provide interface clock settings at the first setting output 116 in response to the first control signal; and provide root clock settings at the second setting output 118 in response to the second control signal. In some examples, the setting detection circuit 110 receives a third control signal. In some examples, the first control signal is an interface clock signal, the second control signal is a root clock signal, and the third control signal is a frame sync clock signal. Without limitation, the setting detection circuit 110 provides clock settings (e.g., an interface clock frequency, a root clock frequency, a root frame sync clock frequency, a root clock to frame sync clock ratio, and/or other clock settings) at the first setting output 116, the second setting output 118, and/or other setting outputs. In some examples, the setting detection circuit 110 includes dedicated hardware for real-time detection of interface clocks, managing state-machines, and general housekeeping of the clock generator resources 132.

The clock generator resources 132 have a root clock input 134, a control input 136, and resource clock outputs 138A to 138N. The control input 136 is coupled to the output interface 130 of the processor 120. In operation, the processor 120 executes a clock tree search algorithm 122 to determine the resource configuration parameters. Without limitation, the inputs to the clock tree search algorithm 122 may include: a root clock source, the number of enabled interfaces, the frame clock and bit-clock-to-frame-clock ratio values for each interface, the configuration of each interface (e.g., as a primary interface or secondary interface), a modulation clock value (e.g., a frequency, a range, or a multiple related to another clock value), a DEM clock value (e.g., a frequency, a range, or a multiple related to another clock value), a PLL preference setting (e.g., integers only or fractions allowed), a digital microphone clock value (e.g., a frequency, a range, or a multiple related to another clock value), and device configuration settings (e.g., the number of enabled channels, decimation and interpolation filter type, sample rate converters, etc.).

In some examples, the clock tree search algorithm 122 is a low-latency constrained optimization algorithm to compute clock tree registers responsive to the clock settings provided by the setting detection circuit 110. The clock tree search algorithm 122 finds the best set of resource configuration parameters for the clock generator resources 132 responsive to the interface clock(s), a root clock, and target settings detected by the setting detection circuit 110. In some examples, the clock tree search algorithm 122 is based on or responsive to one or more of: 1) satisfaction of all user and system constraints; 2) highest performance metrics (e.g., low clock jitter); 3) lowest power consumption; and 4) providing feedback to a user in the event of a search error. The outputs of the clock tree search algorithm 122 include the resource configuration parameters.

In operation, the clock generator resources 132 provide clock signals (e.g., CLK1 to CLKN) at the resource clock outputs 138A to 138N in response to the resource configuration parameters received at the control input 136 and the root clock signal received at the root clock input 134. In some examples, the clock generator resources 132 include a phase-locked loop (PLL), analog-to-digital converter (ADC) dividers, digital-to-analog converter (DAC) dividers, digital signal processor (DSP) dividers, and communication interface dividers.

With the adaptive clock generator circuitry 106, the clock signals (e.g., CLK1 to CLKN) provided by the clock generator resources 132 are constrained based on the clock settings received at the input interface (e.g., inputs 124, 126) and based on the target settings received at the input 128. Compared to another approach, the adaptive clock generator circuitry 106 reduces the circuit size and related power consumption of clock generation operations by leveraging an available processor 120 and the clock generator resources 132 to execute a clock tree search algorithm 122 to determine the resource configuration parameters for a constrained set of clock signals (e.g., CLK1 to CLKN) for the circuit 100.

Figure 2:
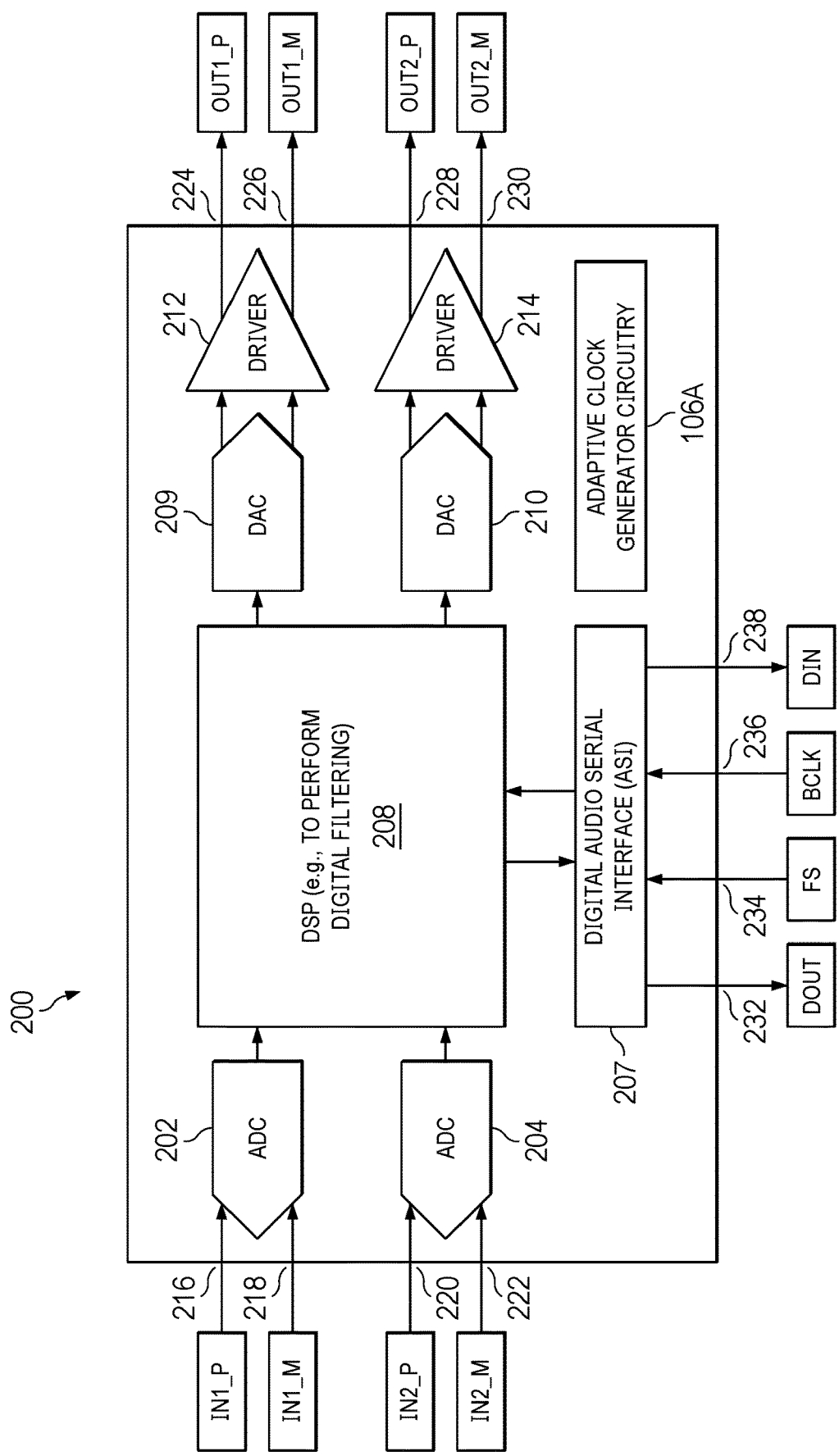
FIG. 2 is a diagram showing an example encoder/decoder (codec) circuit.

FIG. 2 is a diagram showing an example codec circuit 200. The codec circuit 200 is an example of the circuit 100 and may be an IC in some examples. In the example of FIG. 2, the codec circuit 200 has first differential inputs 216 and 218, second differential inputs 220 and 222, first differential outputs 224 and 226, and second differential outputs 228 and 230. The codec circuit 200 also has a digital data output 232, a frame sync input 234, a bit clock input 236, and a digital data input 238.

In the example of FIG. 2, the codec circuit 200 includes a first ADC 202, a second ADC 204, a digital ASI circuit 207, a DSP 208, a first DAC 209, a second DAC 210, a first driver 212, and a second driver 214. As shown, the first ADC 202 is coupled to the first differential inputs 216 and 218. The second ADC 204 is coupled to the second differential inputs 220 and 222. The DSP 208 is coupled to the digital ASI 207 and to the outputs of the first and second ADCs 202 and 204. In some examples, the DSP 208 performs digital filtering operations related to encoding or decoding data. The encoded or decoded outputs of the DSP 208 are provided to the first and second DACs 209 and 210. The output of the first DAC 209 is coupled to the first driver 212. The output of the second DAC 210 is coupled to the second driver 214. The output of the first driver 212 is coupled to the first differential outputs 224 and 226. The output of the second driver 214 is coupled to the second differential outputs 228 and 230.

In the example of FIG. 2, INx_P and INx_M represent analog input signals. OUTx_P and OUTx_M represent analog output signals. DOUT represents a digital data output stream. DIN represents a digital data input stream. FS represents the frame sync clock that determines the sample rate. BCLK represents the bit clock used for driving (transmitting) digital data. In some examples, the digital ASI 207 operates in a secondary (slave) mode. In other examples, the digital ASI 207 operates in a primary (master) mode. In such scenarios, FS and BCLK are generated by the codec circuit 200 as output signals.

As shown, the codec circuit 200 includes adaptive clock generator circuitry 106A (an example of the adaptive clock generator circuitry 106 in FIG. 1). In operation, the adaptive clock generator circuitry 106A generates clock signals for the first and second ADCs 202 and 204, the first and second DACs 209 and 210, the DSP 208, and the digital ASI 207. In some examples, the clock signals generated by the adaptive clock generator circuitry 106A are constrained based on root clock settings, interface clock settings, and/or target settings as described herein. In some examples, the adaptive clock generator circuitry 106A generates synchronous clock signals for the components of the codec circuit 200. In some examples, there may be multiple ASIs including a primary ASI and a secondary ASI. In such examples, the selection of $ROOT_{CLK}$ is configurable and is set to BCLK of the primary ASI.

Figure 3A:
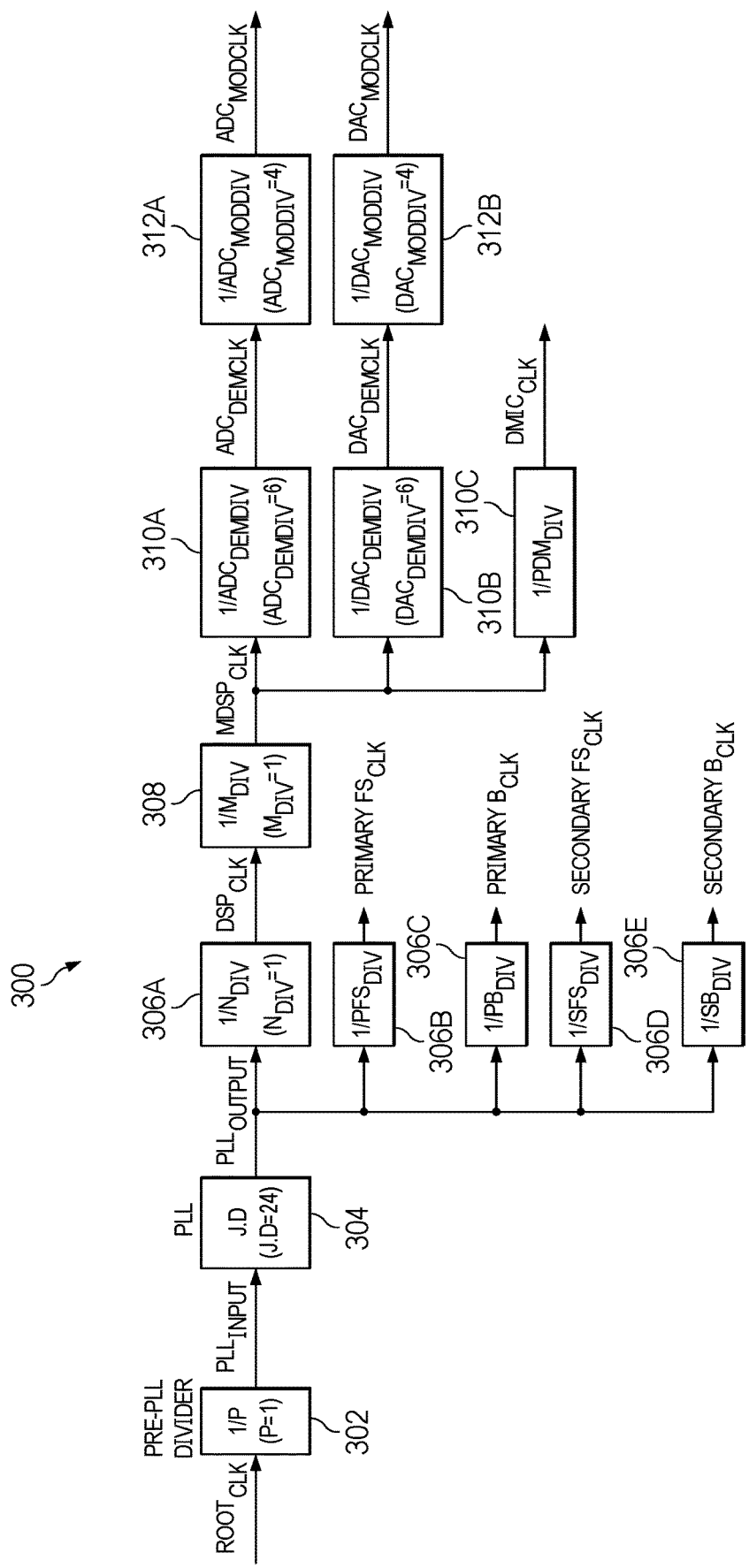
FIGS. 3A-3C are block diagrams showing example clock trees.
Figure 3B:
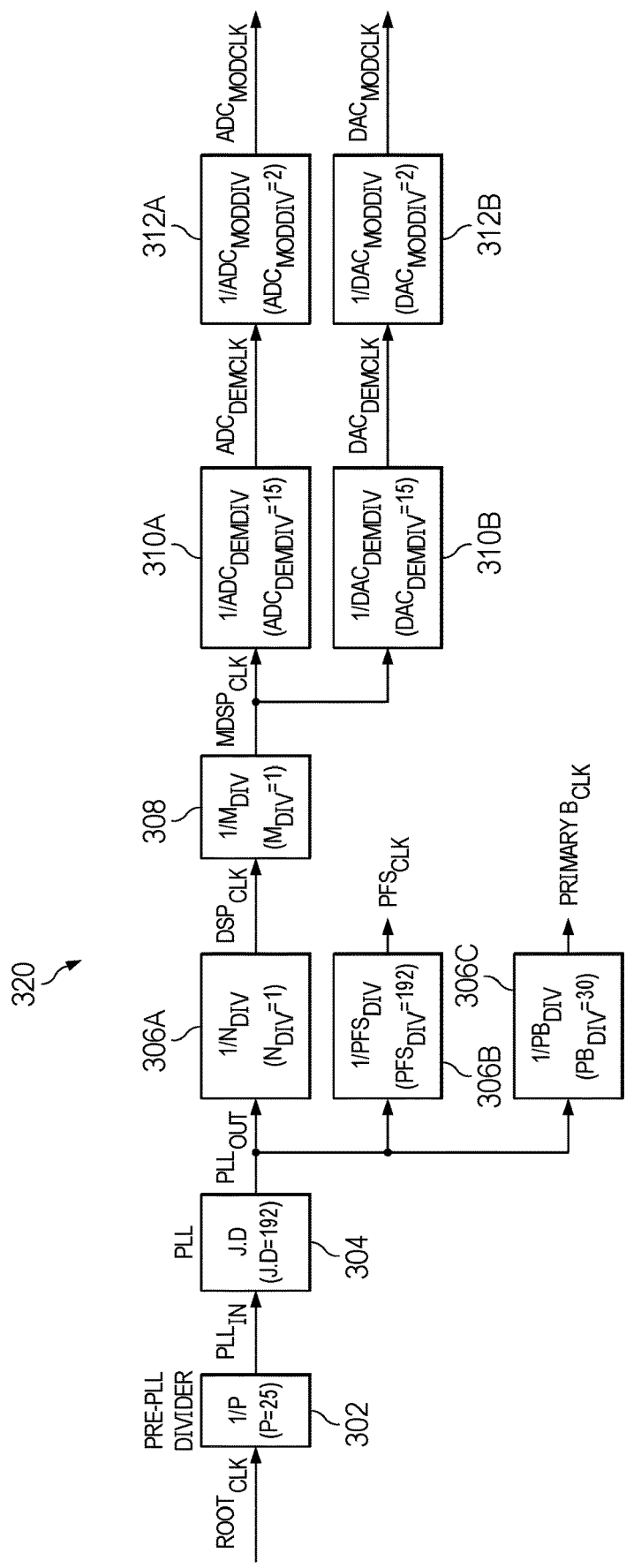
Figure 3C:
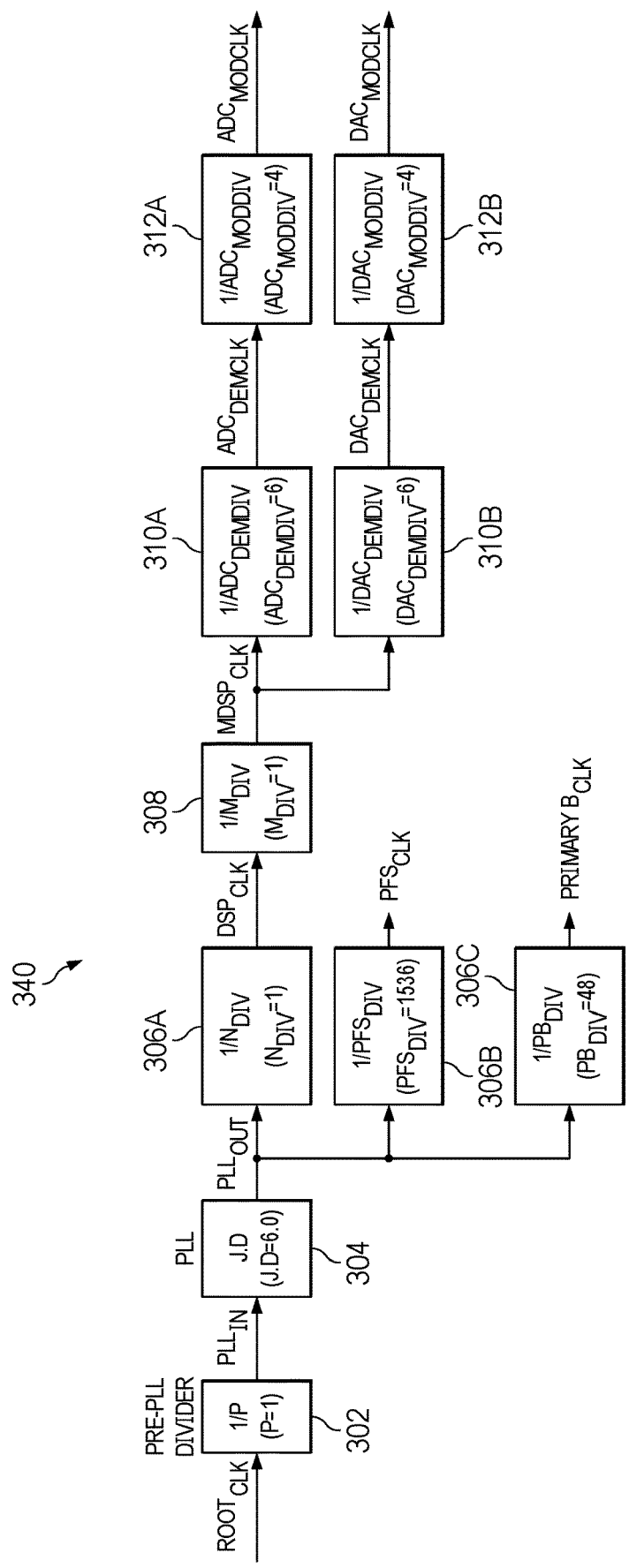

FIGS. 3A-3C are block diagrams showing example clock trees 300, 320 and 340. In the example of FIG. 3A, the clock tree 300 includes clock generator resources (an example of the clock generator resources 132 in FIG. 1) of: a pre-PLL clock divider 302; a PLL 304; a DSP clock divider 306A; a primary frame sync clock divider 306B; a primary bit clock divider 306C; a secondary frame sync clock divider 306D; a secondary bit clock divider 306E; a modified DSP clock divider 308; a DEM ADC clock divider 310A; a DEM DAC clock divider 310B; a digital microphone clock divider 310C; a modulation ADC clock divider 312A; and a modulation DAC clock divider 312B.

In the example of FIG. 3A, the pre-PLL clock divider 302 operates to: receive a root clock signal ($ROOT_{CLK}$); and provide a PLL input clock signal ($PLL_{INPUT}$) by dividing $ROOT_{CLK}$ by a pre-PLL clock divider value (P). The PLL 304 operates to: receive $PLL_{INPUT}$; and provide an output PLL clock signal ($PLL_{OUTPUT}$) by multiplying $PLL_{INPUT}$ by a PLL multiplier value (J·D), where J is an integer PLL multiplier value, D is an optional fractional PLL multiplier value, and "·" is a dot product function. The DSP clock divider 306A operates to: receive $PLL_{OUTPUT}$; and provide a DSP clock signal ($DSP_{CLK}$) by dividing $PLL_{OUTPUT}$ by a DSP clock divider value ($N_{DIV}$). The primary frame sync clock divider 306B operates to: receive $PLL_{OUTPUT}$; and provide a primary frame sync clock ($PRIMARY\ FS_{CLK}$) by dividing $PLL_{OUTPUT}$ by a primary frame sync clock divider value ($PFS_{DIV}$). The primary bit clock divider 306C operates to: receives $PLL_{OUTPUT}$; and provide a primary bit clock ($PRIMARY\ B_{CLK}$) by dividing $PLL_{OUTPUT}$ by a primary bit clock divider value ($PB_{DIV}$). The secondary frame sync clock divider 306D operates to: receive $PLL_{OUTPUT}$; and provide a secondary frame sync clock ($SECONDARY\ FS_{CLK}$) by dividing $PLL_{OUTPUT}$ by a secondary frame sync clock divider value ($SFS_{DIV}$). The secondary bit clock divider 306E operates to: receive $PLL_{OUTPUT}$; and provide a second bit clock ($SECONDARY\ B_{CLK}$) by dividing $PLL_{OUTPUT}$ by a secondary bit clock divider value ($SB_{DIV}$).

The modified DSP clock divider 308 operates to: receives $DSP_{CLK}$; and provide a modified DSP clock signal ($MDSP_{CLK}$) by dividing $DSP_{CLK}$ by a modified DSP clock divider value ($M_{DIV}$). The DEM ADC clock divider 310A operates to: receive $MDSP_{CLK}$; and provide a DEM ADC clock signal ($ADC_{DEMCLK}$) by dividing $MDSP_{CLK}$ by a DEM ADC clock divider value ($ADC_{DEMDIV}$). The DEM DAC clock divider 310B operates to: receive $MDSP_{CLK}$; and provide a DEM DAC clock signal ($DAC_{DEMCLK}$) by dividing $MDSP_{CLK}$ by a DEM DAC clock divider value ($DAC_{DEMDIV}$). The digital microphone clock divider 310C operates to: receive $MDSP_{CLK}$; and provide a digital microphone clock signal ($DMIC_{CLK}$) by dividing $MDSP_{CLK}$ by a digital microphone clock divider value ($PDM_{DIV}$). The modulation ADC clock divider 312A operates to: receive $ADC_{DEMCLK}$; and provide a modulation ADC clock signal ($ADC_{MODCLK}$) by dividing $ADC_{DEMCLK}$ by a modulation ADC clock divider value ($ADC_{MODDIV}$). The modulation DAC clock divider 312B operates to: receive $DAC_{DEMCLK}$; and provide a modulation DAC clock signal ($DAC_{MODCLK}$) by dividing $DAC_{DEMCLK}$ by a modulation DAC clock divider value ($DAC_{MODDIV}$).

In some examples, the clock tree 300 of FIG. 3A is a codec circuit clock tree, where the codec circuit includes a single ASI operating in a secondary mode at 48 kHz. In such case, example values for the clock tree 300 include: a frame sync (FS) clock at 48 kHz; 32 bits/channel; $B_{CLK}=2*32*48$ KHz=3.072 MHz; and a PLL (e.g., the PLL 304) set to integer mode. Assuming the codec circuit's DSP (e.g., the DSP 208 in FIG. 2) uses 1000 cycles per sample to perform digital filtering of two channels, the minimum $DSP_{CLK}=1000*48000=48$ MHz. Other example clock constraints for the clock tree 300 include $ADC_{MODCLK}$ and $DAC_{MODCLK}$ at 3.072 MHz with a 5% tolerance. Example PLL clock constraints include: 256 KHz<$PLL_{input}$<20 MHz and 65 MHz<$PLL_{out}$<120 MHz. Example DEM clock constraints include the DEM clocks (e.g., $ADC_{DEMCLK}$ or $DAC_{DEMCLK}$) being 2 or 4 times greater than the modulation clocks (e.g., $ADC_{MODCLK}$ or $DAC_{MODCLK}$). If the PLL integer mode is used, D is set to 0.

With these constraints, example values for the clock tree 300 include: $ROOT_{CLK}=3072$ kHz; $PLL_{INPUT}=3072$ KHz; $PLL_{OUTPUT}=73.728$ MHz; $DSP_{CLK}=73.728$ MHz; $MDSP_{CLK}=73.728$ MHz; $ADC_{DEMCLK}=12.288$ MHz; $DAC_{DEMCLK}=12.288$ MHz; $ADC_{MODCLK}=3.072$ MHz; and $DAC_{MODCLK}=3.072$ MHz. To achieve these values, various resource configuration values (e.g., divider value or multiplier values) for the clock tree 300 are determined by a processor (e.g., the processor 120 in FIG. 1) executing a clock tree search algorithm (e.g., the clock tree search algorithm 122 in FIG. 1). In this example, the resource configuration values include: P=1; J·D=24; $N_{DIV}=1$; $M_{DIV}=1$; $ADC_{DEMDIV}=6$; $DAC_{DEMDIV}=6$; $ADC_{MODDIV}=4$; and $ADC_{MODDIV}=4$.

In the example of FIG. 3B, the clock tree 320 includes clock generator resources (an example of the clock generator resources 132 in FIG. 1) such as: the pre-PLL clock divider 302; the PLL 304; the DSP clock divider 306A; the primary frame sync clock divider 306B; the primary bit clock divider 306C; the modified DSP clock divider 308; the DEM ADC clock divider 310A; the DEM DAC clock divider 310B; the modulation ADC clock divider 312A; and the modulation DAC clock divider 312B. Moreover, the pre-PLL clock divider 302, the PLL 304, the DSP clock divider 306A, the primary frame sync clock divider 306B, the primary bit clock divider 306C, the modified DSP clock divider 308, the DEM ADC clock divider 310A, the DEM DAC clock divider 310B, the modulation ADC clock divider 312A, and the modulation DAC clock divider 312B have the same function as described for the clock tree 300 of FIG. 3A. In some examples, the clock tree 320 of FIG. 3B is a codec circuit clock tree, wherein the codec circuit includes a single ASI operating in a primary mode at 48 KHz with a 12.0 Mhz primary clock input. In such case, example values for the clock tree 320 include: a FS clock at 48 KHz; 32 bits/channel; and $B_{CLK}=2*32*48$ KHz=3.072 MHz; and a PLL (e.g., the PLL 304) set to integer mode.

Assuming the codec circuit's DSP (e.g., the DSP 208 in FIG. 2) uses 1000 cycles per sample to perform digital filtering of two channels, the minimum $DSP_{CLK}=1000*48000=48$ MHz. Other example clock constraints for the clock tree 320 include $ADC_{MODCLK}$ or $DAC_{MODCLK}$ at 3.072 MHz with a 5% tolerance. Example PLL clock constraints include: 256 KHz<$PLL_{input}$<20 MHz and 65 MHz<$PLL_{out}$<120 MHz. Example DEM clock constraints include the DEM clocks (e.g., $ADC_{DEMCLK}$ or $DAC_{DEMCLK}$) being 2 or 4 times greater than the modulation clocks (e.g., $ADC_{MODCLK}$ or $DAC_{MODCLK}$). If the PLL integer mode is used, D is set to 0.

With these constraints, acceptable values for the clock tree 320 include: $ROOT_{CLK}=12.0$ MHz; $PLL_{INPUT}=480$ KHz; $PLL_{OUTPUT}=92.16$ MHz; $DSP_{CLK}=92.16$ MHz; $PFS_{CLK}=48$ KHz; $PRIMARY\ B_{CLK}=3.072$ MHz; $MDSP_{CLK}=92.16$ MHz; $ADC_{DEMCLK}=6.144$ MHz; $DAC_{DEMCLK}=6.144$ MHz; $ADC_{MODCLK}=3.072$ MHz; and $DAC_{MODCLK}=3.072$ MHz. To achieve these values, various resource configuration values (e.g., divider value or multiplier values) for the clock tree 320 are determined by a processor (e.g., the processor 120 in FIG. 1) that executes a clock tree search algorithm (e.g., the clock tree search algorithm 122 in FIG. 1). In this example, the resource configuration values include: P=25; J·D=192; $N_{DIV}$=1; $PFS_{DIV}$=1920; $PB_{DIV}$=30; $M_{DIV}$=1; $ADC_{DEMDIV}$=15; $DAC_{DEMDIV}$=15; $ADC_{MODDIV}$=2; and $ADC_{MODDIV}$=2. In the example of FIG. 3B, the DEM clocks (e.g., $ADC_{DEMCLK}$ or $DAC_{DEMCLK}$) are 2 times greater than the modulation clocks (e.g., $ADC_{MODCLK}$ or $DAC_{MODCLK}$) rather than 4 times greater as a factor of 4 would result in $PLL_{OUTPUT}$=122.288 MHz, which violates the PLL output constraint.

In the example of FIG. 3C, the clock tree 340 includes clock generator resources (an example of the clock generator resources 132 in FIG. 1) such as: the pre-PLL clock divider 302; the PLL 304; the DSP clock divider 306A; the primary frame sync clock divider 306B; the primary bit clock divider 306C; the modified DSP clock divider 308; the DEM ADC clock divider 310A; the DEM DAC clock divider 310B; the modulation ADC clock divider 312A; and the modulation DAC clock divider 312B. Moreover, the pre-PLL clock divider 302, the PLL 304, the DSP clock divider 306A, the primary frame sync clock divider 306B, the primary bit clock divider 306C, the modified DSP clock divider 308, the DEM ADC clock divider 310A, the DEM DAC clock divider 310B, the modulation ADC clock divider 312A, and the modulation DAC clock divider 312B have the same function as described for the clock tree 300 of FIG. 3A.

In some examples, the clock tree 340 of FIG. 3C relates to a codec circuit having a dual ASI with a first ASI operating in a primary mode and a second ASI operating in a secondary mode. In such case, example values for the clock tree 320 include: PRIMARY $FS_{CLK}$=48 KHz; PRIMARY $B_{CLK}$=1.536 MHz; SECONDARY $FS_{CLK}$=24 KHz; a SECONDARY $B_{CLK}$=12.288 MHz; a PLL (e.g., the PLL 304) set to integer mode; and SECONDARY $B_{CLK}$ is set as $ROOT_{CLK}$.

In some examples, the clock tree 340 of FIG. 3C is a codec circuit clock tree, where the codec circuit includes dual ASIs. The dual ASIs include, for example, a first ASI operating in a primary mode and a second ASI operating in a secondary mode. In such case, example values for the clock tree 320 include: PRIMARY $FS_{CLK}$=48 KHz; PRIMARY $B_{CLK}$=1.536 MHz; SECONDARY $FS_{CLK}$=24 KHz; a SECONDARY $B_{CLK}$=12.288 MHz; a PLL (e.g., the PLL 304) set to integer mode; and SECONDARY $B_{CLK}$ is set as $ROOT_{CLK}$. Assuming the codec circuit's DSP (e.g., the DSP 208 in FIG. 2) uses 1000 cycles per sample to perform digital filtering of two channels, the minimum $DSP_{CLK}$=1000*48000=48 MHz. Other example clock constraints for the clock tree 320 include $ADC_{MODCLK}$ or $DAC_{MODCLK}$ at 3.072 MHz with a 5% tolerance. Example PLL clock constraints include: 256 KHz<$PLL_{input}$<20 MHz and 65 MHz<$PLL_{out}$<120 MHz. Example DEM clock constraints include the DEM clocks (e.g., $ADC_{DEMCLK}$ or $DAC_{DEMCLK}$) being 2 or 4 times greater than the modulation clocks (e.g., $ADC_{MODCLK}$ or $DAC_{MODCLK}$). If the PLL integer mode is used, D is set to 0.

With these constraints, acceptable values for the clock tree 340 include: $ROOT_{CLK}$=12.0 MHz; $PLL_{INPUT}$=12.0 MHz; $PLL_{OUTPUT}$=73.728 MHz; $DSP_{CLK}$=73.728 MHz; $PFS_{CLK}$=48 KHz; PRIMARY $B_{CLK}$=3.072 MHz; $MDSP_{CLK}$=73.728 MHz; $ADC_{DEMCLK}$=12.288 MHz; $DAC_{DEMCLK}$=12.288 MHz; $ADC_{MODCLK}$=3.072 MHz; and $DAC_{MODCLK}$=3.072 MHz. To achieve these values, various resource configuration values (e.g., divider value or multiplier values) for the clock tree 340 are determined by a processor (e.g., the processor 120 in FIG. 1) that executes a clock tree search algorithm (e.g., the clock tree search algorithm 122 in FIG. 1). In this example, the resource configuration values include: P=1; J·D=6.0; $N_{DIV}$=1; $PFS_{DIV}$=1536; $PB_{DIV}$=48; $M_{DIV}$=1; $ADC_{DEMDIV}$=6; $DAC_{DEMDIV}$=6; $ADC_{MODDIV}$=4; and $ADC_{MODDIV}$=4.

In some examples, adaptive clock trees (e.g., the clock trees 300, 320, and 340 in FIGS. 3A to 3C) are based on target settings (e.g., user and/or system constraints), where some target settings may have higher priority than other target settings. An example target setting is whether a modulator operating mode is selected as high-performance or low-performance. When the modulator operating mode is selected as high-performance, the modulator clocks are to be within a certain tolerance (e.g., 5-10%) of a first target modulator frequency (e.g., 3072 kHz). When the modulator operating mode is selected as low-performance, the modulator clocks are to be within a certain tolerance (e.g., 5-10%) of a second target modulator frequency (e.g., 1536 kHz), where the second target modulator frequency consumes less power than the first second target modulator frequency.

Another example target setting is a DEM clock multiple (DCM) (e.g., 1×, 2×, 4×, and automatic) relative to the modulator clock frequency. The DEM clock defines the rate at which DEM blocks are to be clocked. A higher DEM clock results in better performance (compared to a lower DEM clock). A lower DEM clock consumes less power and provide more clock tree configuration options (increasing the chances of running a PLL in integer mode). In some examples, DCM options are 1×, 2×, 4×, and automatic. For the automatic option, the highest possible DCM is selected.

Another example target setting is a DSP operating clock. The DSP operating clock is a system constraint that depends on the sampling rate, features and channels enabled by the user. The performance of a DSP may be defined by its respective MIPS (Million Instructions Per Second) rating. In some examples (e.g., RISC processors), a DSP executes one instruction per second and so the DSP operating clock and the MIPS rating are the same. In some examples, MIPS rating=(#cycles used to process one sample)*frame sync clock. The MIPS rating depends on many factors, but the most significant factor is the sampling rate. The cycles depend on the number of channels enabled, the features enabled on each channel, etc. In some examples, the clock tree search algorithm uses a DSP operating clock constraint to such that the DSP operating clock achieves a target MIPS rating.

Other example target settings are PLL constraints. Example PLL constraints include an input frequency ($PLL_{IN}$) range and an output frequency ($PLL_{OUT}$) range. In some examples, 256 KHz<$PLL_{IN}$<20 MHz and 65 MHz<$PLL_{OUT}$<135 MHz.

Other example target settings are PLL performance mode options (e.g., an integer/fractional mode setting). In the integer mode, $PLL_{OUTPUT}$ is an integer multiple of $PLL_{INPUT}$. In the fractional mode, $PLL_{OUTPUT}$ may be fractional multiple of $PLL_{INPUT}$. The PLL performance mode selection may be performed, for example, by a user, e.g., via a user interface and/or mode control input. Compared to the integer mode, the fractional mode lowers PLL performance but facilitates a clock tree solution.

Another example target setting is a reference clock source. The reference clock source provides $ROOT_{CLK}$ herein. In some examples, reference clock source options include external clocks such as: 1) a primary ASI bit clock (e.g., PRIMARY $B_{CLK}$ in FIGS. 3A to 3C) when a primary ASI operates in a secondary mode; 2) a secondary ASI bit clock (e.g., SECONDARY $B_{CLK}$ in FIGS. 3A to 3C) when a secondary ASI operates in a secondary mode; 3) a master clock (mclk) synchronized to the primary ASI bit clock; and 4) mclk synchronized to the secondary ASI bit clock. In some examples, if an external clock is not available, $ROOT_{CLK}$ may be sourced from an on-chip oscillator output.

Other example target settings include frame sync clock and bit clock constraints. When an ASI operates in a primary mode, the frame sync clock and the bit clock are output from the ASI and are generated from the clock tree. In some examples, the frame sync clock and the bit clock are specified ratiometrically (e.g., mclk/frame sync clock=64). In other examples, the frame sync clock and the bit clock are specified in absolute terms (48 KHz or 44.1 KHz). In some examples, the clock tree search algorithm 122 accounts for frame sync clock and bit clock constraints.

In some examples, the clock tree search algorithm 122 provides status outputs for user preferences and/or other clock tree search results. Example status report options are shown in Table 1 below.

TABLE 1

| Status Name | Description |
| --- | --- |
| Run Status | Done/Not Done |
| Algorithm Status | Success/Failure |
| PLL Mode Preference | Integer/Fractional/Not Used |
| PLL Loop bandwidth | 0: (>=512), 1: (<512) |
| DEM Clock Multiple | 4x/2x/1x |
| MIPS Overload | Current MIPS cannot be supported |
| Bit Clock Status | 0: Non-uniform Bit Clock 1: Uniform Bit Clock |

Figure 4:
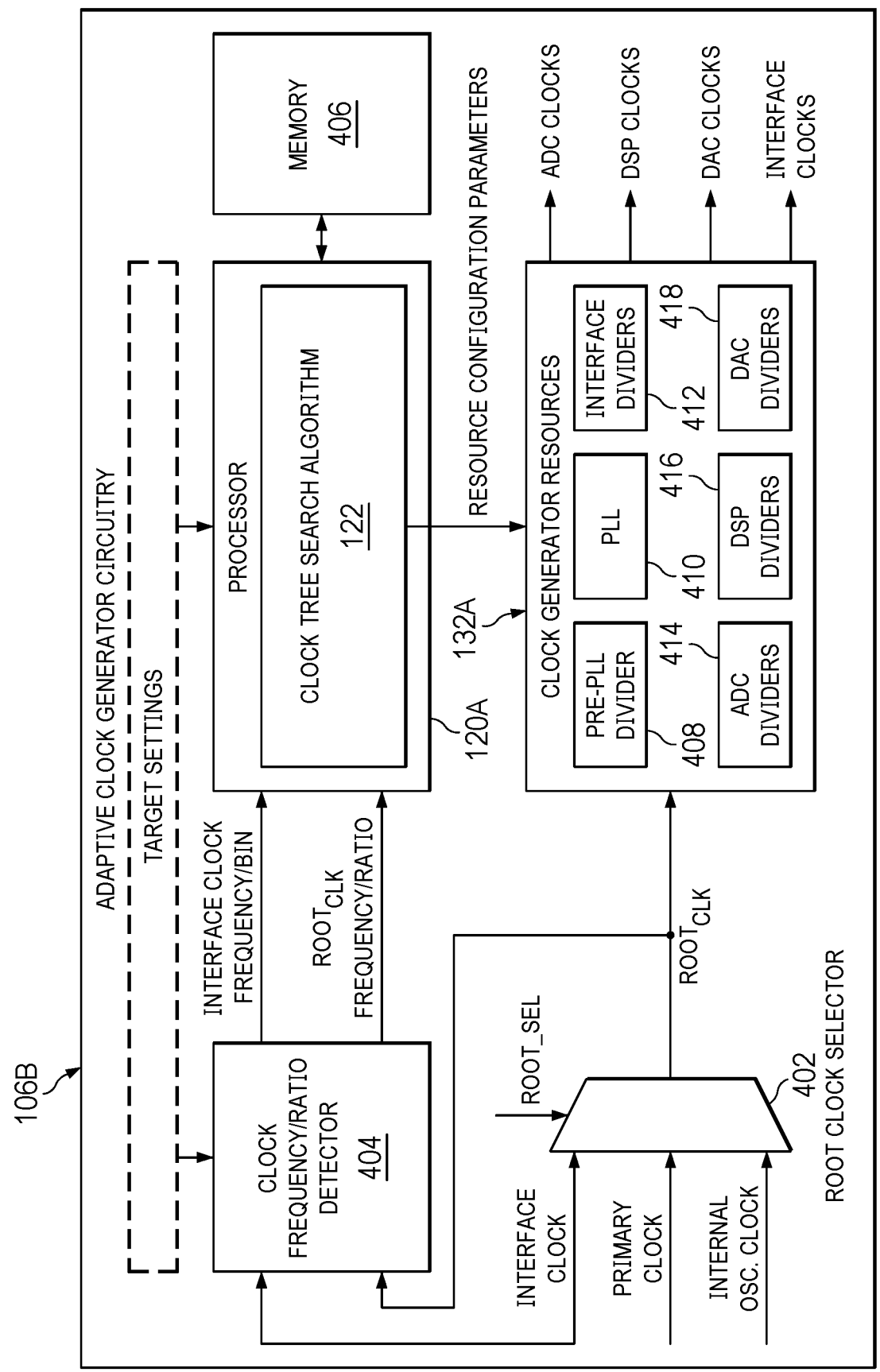
FIG. 4 is a diagram showing example adaptive clock generator circuitry.

FIG. 4 is a diagram showing example adaptive clock generator circuitry 106B. As shown, the adaptive clock generator circuitry 106B includes a root clock selector 402, a clock frequency/ratio detector circuit 404, a processor 120A, memory 406, and clock generator resources 132A. The root clock selector 402 includes, for example, a multiplexer. The clock frequency/ratio detector circuit 404 is an example of the setting detection circuit 110 in FIG. 1. The processor 120A is an example of the processor 120 in FIG. 1. The memory 406 includes, for example, static random-access memory (SRAM) or another rewritable memory. The clock generator resources 132A is an example of the clock generator resources 132 in FIG. 1. The adaptive clock generator circuitry 106B is an example of the adaptive clock generator circuitry 106 in FIG. 1, or the adaptive clock generator circuitry 106A in FIG. 2.

In the example of FIG. 4, the root clock selector 402 operates to: receive interface clock; receive a primary clock; receive an internal oscillator clock; and provide the interface clock, the primary clock, or the internal oscillator clock as $ROOT_{CLK}$ in response to a control signal (ROOT_SEL). In some examples, ROOT_SEL is an adjustable device setting. For example, ROOT_SEL may be set to primary $B_{CLK}$ by default but can be adjusted by a user.

In operation, the clock frequency/ratio detector circuit 404 operates to: receive the interface clock, $ROOT_{CLK}$, and target settings as inputs; and provide clock settings and clock ratios based on the interface clock, $ROOT_{CLK}$, and the target settings. Example clock settings and clock ratios includes an interface clock frequency, an interface clock bin, a $ROOT_{CLK}$ frequency and a $ROOT_{CLK}$ to interface clock ratio. The processor 120A calculates resource configuration parameters based on the clock settings and the clock ratio obtained from the clock frequency/ratio detector circuit 404 and based on the target settings. In some examples, the target settings are provided by a user or are predetermined settings for a particular circuit or scenario. To calculate the resource configuration parameters, the processor 120A may execute instructions stored by the memory 406. Related values may be stored by the memory 406 before, during, and/or after the resource configuration parameters are calculated by the processor 120A.

The resource configuration parameters are provided by the processor 120A to the clock generator resource 132A. Without limitation, the clock generator resources 132A of FIG. 4 include: a pre-PLL divider 408 (e.g., the pre-PLL clock divider 302 in FIGS. 3A to 3C); a PLL 410 (e.g., the PLL 304 in FIGS. 3A to 3C); interface dividers 412 (e.g., primary frame sync clock divider 306B, the primary bit clock divider 306C, the secondary frame sync clock divider 306D, and the secondary bit clock divider 306E); ADC dividers 414 (e.g., the DEM ADC clock divider 310A, or the modulation ADC clock divider 312A in FIGS. 3A to 3C); DSP dividers 416 (e.g., the DSP clock divider 306A, or the modified DSP clock divider 308 in FIGS. 3A to 3C); and DAC dividers 418 (e.g., the modulation DAC clock divider 312B, or the DEM DAC clock divider 310B in FIGS. 3A to 3C). Based on the resource configuration parameters provided by the processor 120A, the clock generator resources 132A provides clock signals such as: ADC clocks; DSP clocks; DAC clocks; and interface clocks. In different scenarios, the resource configuration parameters may vary as described in FIGS. 3A to 3C.

Figure 5A:
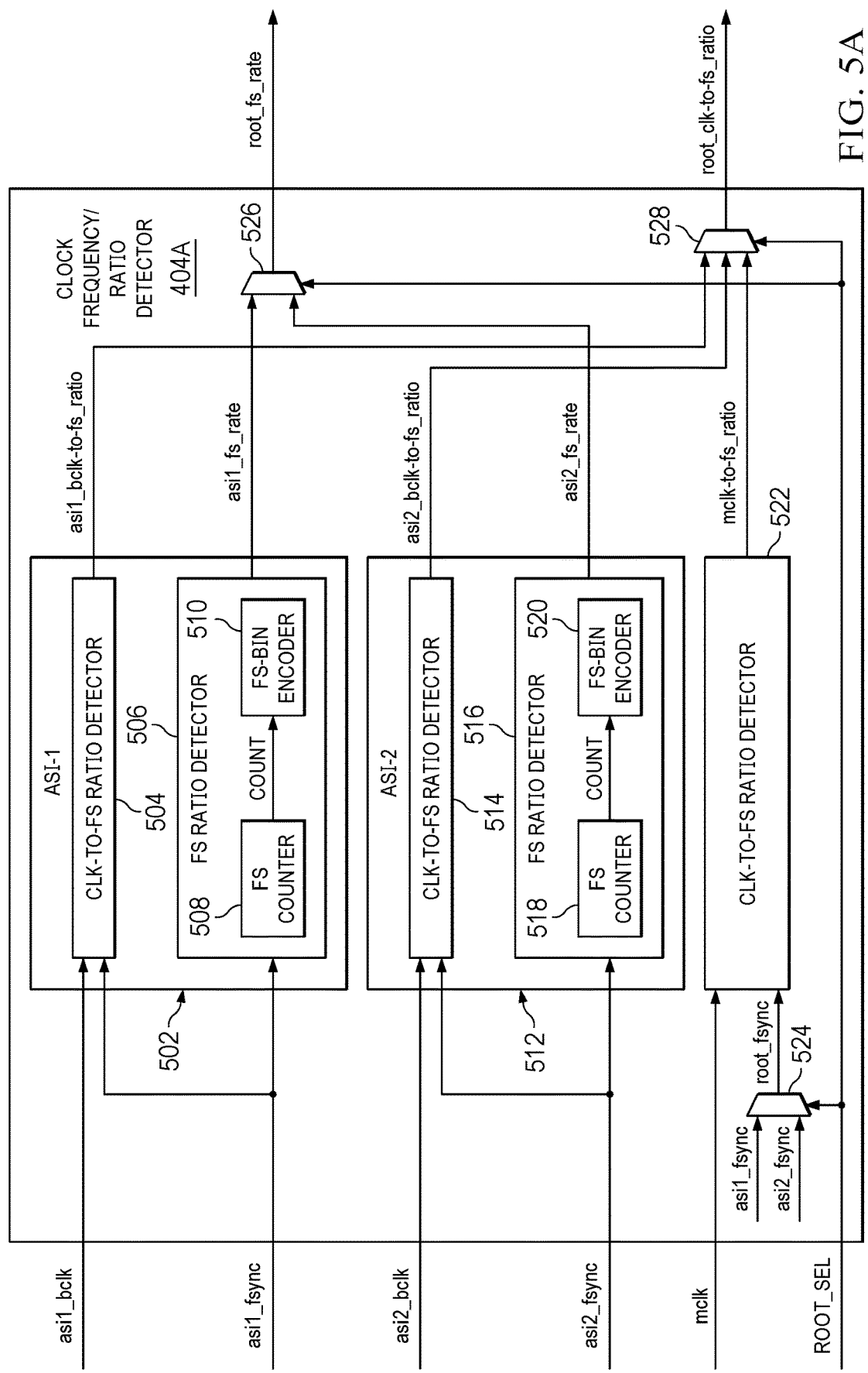
FIGS. 5A and 5B are diagrams showing example clock frequency/ratio detectors.
Figure 5B:
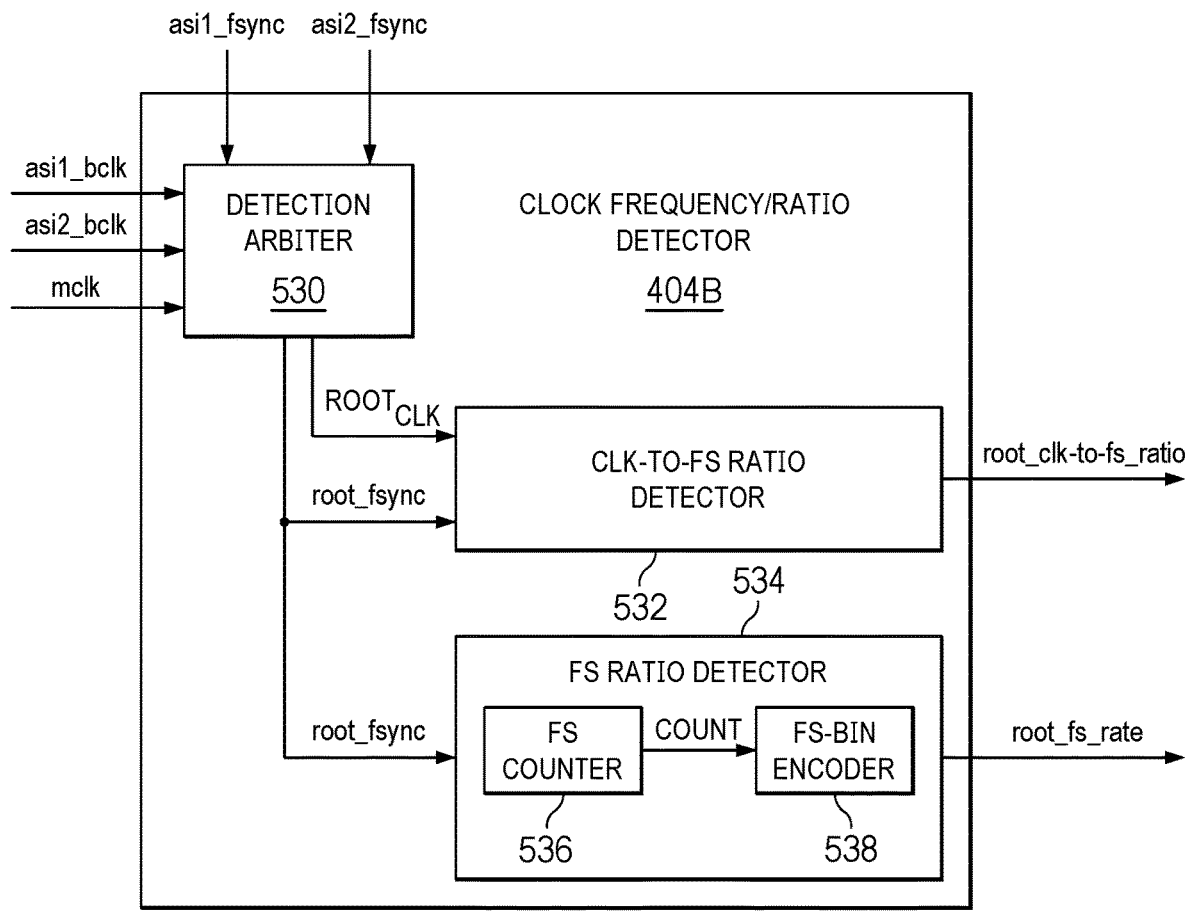

FIGS. 5A and 5B are diagrams showing example clock frequency/ratio detector circuits 404A and 404B, which are examples of the clock frequency/ratio detector circuit 404 in FIG. 4. In FIG. 5A, the clock frequency/ratio detector circuit 404A includes a first ASI interface 502, a second ASI interface 512, a first multiplexer 524, second multiplexer 526, a third multiplexer 528, and a CLK-to-FS ratio detector 522. As shown, the first ASI interface 502 includes a first clock-to-FS ratio detector 504 and a first FS ratio detector 506. The first FS ratio detector 506 includes a first FS counter 508 and a first FS bin encoder 510. The second ASI interface 512 includes a second clock-to-FS ratio detector 514 and a second FS ratio detector 516. The second FS ratio detector 516 includes a second FS counter 518 and a second FS bin encoder 520.

In the example of FIG. 5A, the first ASI interface 502 receives a first ASI bit clock signal (asi1_bclk) and a first ASI frame sync clock signal (asi1_fsync). The first clock-to-FS ratio detector 504 operates to: receive asi1_bclk and asi1_fsync; and provide a first ASI bit clock to frame sync clock ratio (asi1_bclk_to_fs_ratio) responsive to asi1_bclk and asi1_fsync. The first FS ratio detector 506 operates to provide a first ASI frame sync rate (asi1_fs_rate) responsive to asi1_fsync and the operations of the first FS counter 508 and the first FS bin encoder 510.

As shown, the second ASI interface 512 receives a second ASI bit clock signal (asi2_bclk) and a second ASI frame sync clock signal (asi2_fsync). The second clock-to-FS ratio detector 514 operates to: receive asi2_bclk and asi2_fsync; and provide a second ASI bit clock to frame sync clock ratio (asi2_bclk_to_fs_ratio) responsive to asi2_bclk and asi2_fsync. The second FS ratio detector 516 operates to provide a second ASI frame sync rate (asi2_fs_rate) responsive to asi2_fsync and the operations of the second FS counter 518 and the second FS bin encoder 520.

In the example of FIG. 5A, the clock frequency/ratio detector circuit 404A also includes a third clock-to-FS ratio detector 522. As shown, the first multiplexer 524 operates to:

receive asi1_fsync and asi2_fsync as input signals; and output asi1_fsync or asi2_fsync as a root frame sync clock signal (root_fsync) responsive to a root selection control signal (e.g., ROOT_SEL). The third clock-to-FS ratio detector 522 operates to: receive a master clock (mclk) and root_fsync as input signals; and provide a master clock to frame sync clock ratio (mclk-to-fs_ratio) responsive to mclk and root_fsync.

As shown, the second multiplexer 526 operates to: receive asi1_fs_rate and asi2_fs_rate as input signals; and output asi1_fs_rate or asi2_fs_rate as a root frame sync rate (root_fs_rate) responsive to ROOT_SEL. The third multiplexer 528 operates to: receive asi1_bclk_to_fs_ratio, asi2_bclk_to_fs_ratio, and mclk-to-fs_ratio as input signals; and output asi1_bclk-to-fs_ratio, asi2_bclk-to-fs_ratio, or mclk-to-fs_ratio as a root clock to frame sync clock ratio (root_clk-to-fs_ratio) responsive to ROOT_SEL.

In FIG. 5B the clock frequency/ratio detector circuit 404B includes a detection arbiter circuit 530, a clock to frame sync ratio detector 532 and a frame sync (FS) ratio detector 534. In the example of FIG. 5B, the detection arbiter circuit 530 operates to: receive asi1_fsync, asi2_fsync, asi1_bclk, asi2_bclk and mclk; output asi1_bclk, asi2_bclk, or mclk as $ROOT_{CLK}$; and output asi1_fsync or asi2_fsync as root_fsync. The clock to frame sync ratio detector 532 operates to: receive $ROOT_{CLK}$ and root_fsync as input signals; and output root_clk-to-fs_ratio responsive to $ROOT_{CLK}$ and root_fsync. The FS ratio detector 534 operates to: receive root_fsync; and output root_fs_rate responsive to root_fsync and the operations of the FS counter 536 and the FS bin encoder 538.

Figure 6A:
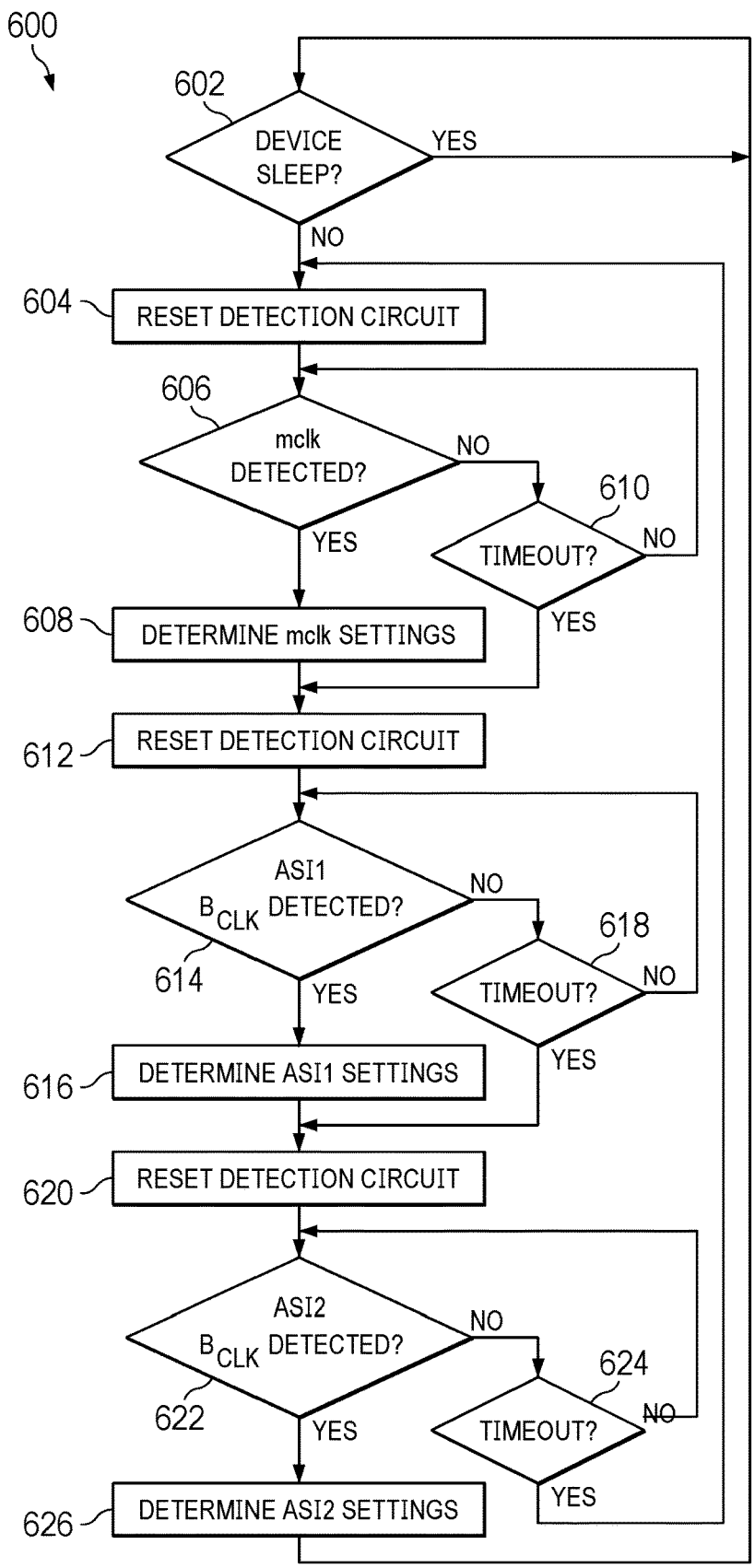
FIGS. 6A and 6B are flowcharts showing example clock frequency/ratio detection methods.
Figure 6B:
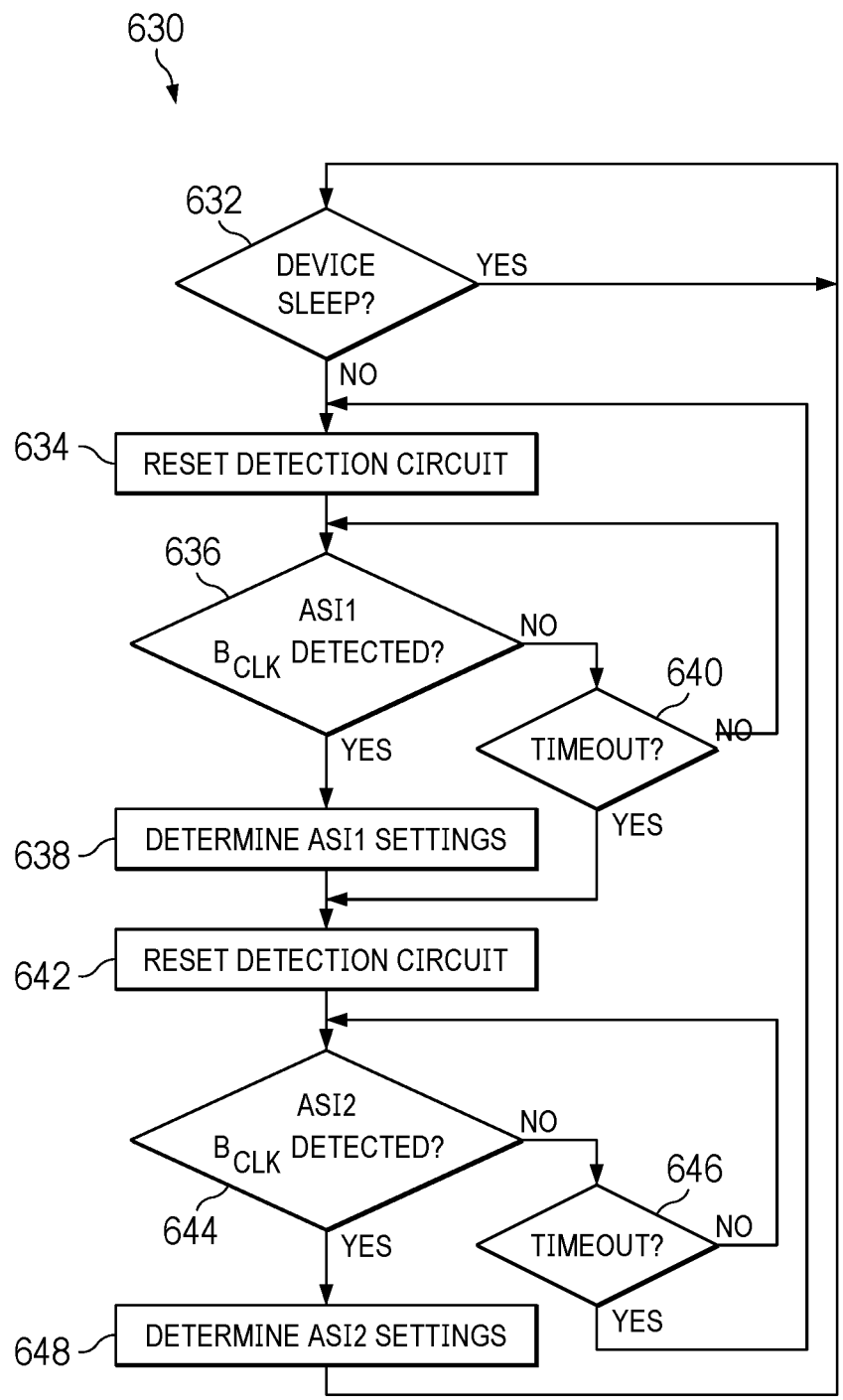

FIGS. 6A and 6B are flowcharts showing example clock frequency/ratio detection methods 600 and 630, respectively. The method 600 of FIG. 6A is used for clock frequency/ratio detection when mclk is enabled. Otherwise, the method 630 of FIG. 6B is used for clock frequency/ratio detection. As shown, the clock frequency/ratio detection method 600 of FIG. 6A includes, at block 602, waiting until the device (e.g., the circuit 100 of FIG. 1 or the codec circuit 200 of FIG. 2) is not asleep (block 602) and resetting the detection circuit at block 604. For example, the clock frequency/ratio detector circuit 404 in FIG. 4, the clock frequency/ratio detector circuit 404A in FIG. 5A, or the clock frequency/ratio detector circuit 404B in FIG. 5B is reset at block 604.

In some example, reset of the detection circuit (e.g., at blocks 604, 612, or 620 in FIG. 6A, or at blocks 634 or 642 in FIG. 6B) involves a reset signal and/or temporarily gating power or other input signals to the detection circuit. If mclk is detected by the detection circuit (block 606) after the reset of block 604, mclk settings are determined at block 608. In some examples, determining clock settings (e.g., at blocks 608, 616, or 626 in FIG. 6A, or at blocks 638 or 848 in FIG. 6B) involves a counter, a bin encoder, and/or a ratio detector (e.g., as in the examples of FIG. 5A or FIG. 5B). Otherwise, if mclk is not detected by the detection circuit (block 606) after the reset of block 604 and a timeout has not occurred (block 610), the method 600 returns to block 606.

After mclk settings are determined at block 608 or after a timeout (block 610), the detection circuit is reset at block 612. If ASI1 $B_{CLK}$ is detected by the detection circuit (block 614) after the reset of block 612, ASI1 settings are determined at block 616. Otherwise, if ASI1 $B_{CLK}$ is not detected by the detection circuit (block 614) after the reset of block 612 and a timeout has not occurred (block 618), the method 600 returns to block 614. After ASI1 $B_{CLK}$ settings are determined at block 616 or after a timeout (block 618), the detection circuit is reset at block 620.

If ASI2 $B_{CLK}$ is detected by the detection circuit (block 622) after the reset of block 620, ASI2 settings are determined at block 626. Otherwise, if ASI2 $B_{CLK}$ is not detected by the detection circuit (block 622) after the reset of block 620 and a timeout has not occurred (block 624), the method 600 returns to block 622. After ASI2 $B_{CLK}$ settings are determined at block 626 or after a timeout (block 624), the method 600 returns to block 602.

As shown, the clock frequency/ratio detection method 630 of FIG. 6B includes, at block 632, waiting until the device (e.g., the circuit 100 of FIG. 1, or the codec circuit 200 of FIG. 2) is not asleep and resetting the detection circuit at block 634. For example, the clock frequency/ratio detector circuit 404 in FIG. 4, the clock frequency/ratio detector circuit 404A in FIG. 5A, or the clock frequency/ratio detector circuit 404B in FIG. 5B is reset at block 634. If ASI1 $B_{CLK}$ is detected by the detection circuit (block 636) after the reset of block 634, ASI1 settings are determined at block 638. Otherwise, if ASI1 $B_{CLK}$ is not detected by the detection circuit (block 636) after the reset of block 634 and a timeout has not occurred (block 640), the method 630 returns to block 636. After ASI1 $B_{CLK}$ settings are determined at block 638 or after a timeout (block 640), the detection circuit is reset at block 642.

If ASI2 $B_{CLK}$ is detected by the detection circuit (block 644) after the reset of block 642, ASI2 settings are determined at block 648. Otherwise, if ASI2 $B_{CLK}$ is not detected by the detection circuit (block 644) after the reset of block 642 and a timeout has not occurred (block 646), the method 630 returns to block 644. After ASI2 $B_{CLK}$ settings are determined at block 648 or after a timeout (block 646), the method 630 returns to block 632.

After clock settings are determined (e.g., by the setting detection circuit 110 in FIG. 1, the clock frequency/ratio detector circuit 404 in FIG. 4, the clock frequency/ratio detector circuit 404A in FIG. 5A, or the clock frequency/ratio detector circuit 404B in FIG. 5B), one approach to solving the clock tree search would be to use a brute force approach and search through all possible PLL multiplier and pre-divider values. In this brute force approach, ranked sets of constraints are created according to user preference. As an example, for a DCM option of automatic, a higher ranked constraint-set has DCM=4 and a lower ranked constraint-set has DCM=2. The brute force approach then iterates through the constraint-set in descending rank order and performs: 1) a search through every possible integer PLL multiplier J (16K options) and divider P (256 options) and check if they satisfy the constraints in the set; 2) exit with success if a solution set is found; 3) exit with error if there are no more constraint-sets. The brute force approach involves searching through a large number of clock tree options (i.e., 4M or 256*16K) for every constraint-set. The level of computational resources to swiftly determine a solution may not be available in a codec circuit (e.g., the codec circuit 200) as the embedded signal processor has limited processing resources. Alternatively, the computation time for a brute force approach is extremely high, thereby causing the codec startup to be unacceptably slow.

Figure 7:
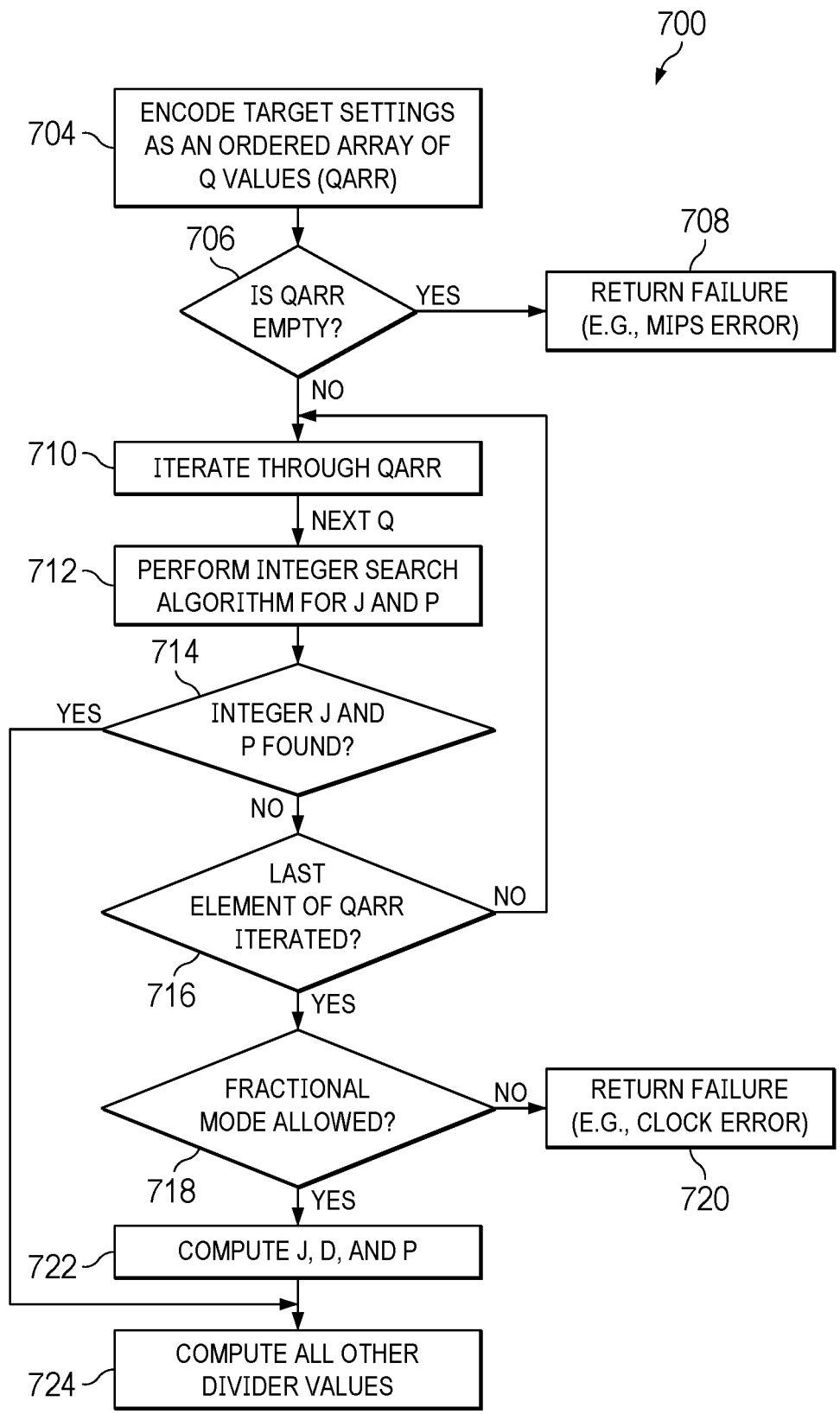
FIG. 7 is a flowchart showing an example method for determining resource configuration parameters.

FIG. 7 is a flowchart showing an example method 700 for determining resource configuration parameters. The method 700 is performed, for example, by a processor executing a clock tree search algorithm. For example, the processor 120 in FIG. 1, the DSP 208 in FIG. 2, or the processor 120A in FIG. 4 executes the clock tree search algorithm 122 in FIGS. 1 and 4 to perform the method 700. As shown, at block 704, the processor encodes target settings as an ordered array of Q values (QARR). At block 706, the processor determines whether QARR is empty. If QARR is empty, the method 700 returns a failure, (e.g., a MIPS error) at block 708. In some examples, returning a failure involves storing a failure indicator and any available failure information (e.g., cause of failure) in memory for later access by a control interface. The control interface queries the memory, for example, in response to a schedule, a trigger, or a user request. In some examples, the control interface is in communication with a graphical user interface (GUI) to display a failure indicator and any available failure information. If QARR is not empty, the processor iterates through QARR at block 710. At block 712, the processor performs an integer search algorithm to determine J and P responsive to the Q value iterated from QARR at block 710. If integer J and P values are found (block 714), the processor computes all other divider values at block 724 (e.g., based on J and P) and the method 700 is complete. Otherwise, if integer J and P values are not found (block 714) and the last element of QARR has not been iterated (block 716), the method 700 returns to block 710. If the integer J and P values are not found (block 714), the last element of QARR has been iterated (block 716), and a fractional mode is not allowed (block 718), the processor returns a failure (e.g., a clock error) at block 720. If the integer J and P values are not found (block 714), the last element of QARR has been iterated (block 716), and a fractional mode is allowed (block 718), the processor computes J, D and P values at block 722. As described in FIGS. 3A to 3C, J is an integer PLL multiplier value, D is a fractional PLL multiplier value, and P is a pre-PLL clock divider value. All other divider values are then computed (e.g., based on J, D, and P) at block 724 and the method is complete.

In some examples, the clock tree search algorithm used to perform the method 700 implements a two-part strategy that involves a search-space reduction followed by a search-space ordering technique and a complementary search algorithm. Accordingly, less optimal solutions are searched through only after more optimal solutions are found to be unsuitable. This reduces the computational requirements and leads to a smaller startup delay. In some examples, the clock tree search algorithm of the method 700 is based on a preference encoder (e.g., for the operations of block 702) and an integer divider search algorithm (IDSA) (e.g., for the operations of block 710 and 712). With a preference encoder, the constraint checking procedure is simplified by encoding target settings (e.g., user and system preferences) as an ordered set of integer multiples of a target modulator clock frequency. The IDSA technique eliminate invalid integer divider and multiplier values from the search space for a given set of user constraints.

For the preference encoder, QARR={Q} is an ordered set of integers such that $Q*MOD_{clk}$ (e.g., $ADC_{MODCLK}$ and $DAC_{MODCLK}$ in FIGS. 3A to 3C are examples of $MOD_{CLK}$) satisfies the following two conditions: 1) an PLL output condition such as Lmin (e.g., 65 MHz)<$Q*MOD_{clk}$<Lmax (e.g., 110.6 MHz); and 2) a MIPS condition such as $Q*MOD_{clk}$>DSP MIPS. In some examples, $MOD_{clk}$ may be a high-performance modulator clock value (3072 kHz) or a low-performance modulator clock value (e.g., 1536 kHz).

In some examples, preference encoding is done in two stages. In the first stage, range identification is performed to find min and max values of QARR. In the second stage, ordered insertion is performed to populate QARR with valid values in an order that reflects the user preference.

In some examples, the range of QARR is determined based on a PLL output constraint and a MIPS constraint. The PLL output constraint may be a minimum and maximum Q range for a given modulator clock option as follows:

$$Q_{pll\,min} = \begin{cases} (\lceil L\,min/HP\,MOD_{clk}\rceil), & \text{if } MOD_{clk} = HP\,MOD_{clk} \\ (\lceil L\,min/LP\,MOD_{clk}\rceil), & \text{if } MOD_{clk} = LP\,MOD_{clk} \end{cases},$$ Equation (1)

and $$Q_{pll\,max} = \begin{cases} (\lfloor L\,max/HP\,MOD_{clk}\rfloor), & \text{if } MOD_{clk} = HP\,MOD_{clk} \\ (\lfloor L\,max/LP\,MOD_{clk}\rfloor), & \text{if } MOD_{clk} = LP\,MOD_{clk} \end{cases}.$$ Equation (2)

In some examples, the maximum PLL clock value is 110592 KHz (i.e., 72*1536 kHz or 36*3072 kHz) and the minimum PLL clock value is 61440 kHz (i.e., 40*1536 kHz or 20*3072 kHz). The MIPS constraint sets the minimum PLL output clock to run the user selected features. If d is the DSP MIPS requirement, d may be computed as follows: 1) assume a user selected feature-set (U) and a main sampling rate ($FS_{main}$); 2) let c be the number of cycles per sample to process U; and 3) then $d=c*FS_{main}$. The MIPS constraint requires that Q satisfy a minimum condition on the DSP clock ($Q_{dspmin}$) given as:

$$Q_{dsp\,min} \geq \frac{d}{MOD_{clk}}, \text{ where } Q_{dsp\,min} = \left\lceil \frac{c*FS_{main}}{MOD_{clk}} \right\rceil = \lceil c/OSR \rceil,$$ Equation (3)

where OSR is the oversampling ratio. In some examples, MIPS and PLL output constraints can be merged to compute the closed interval ($Q_{min}$, $Q_{max}$) that forms the range of Q as:

$$Q_{min} = \max(Q_{pll\,min}, Q_{dsp\,min}),$$ Equation (4)

and $$Q_{max} = \begin{cases} Q_{pll\,max}, & \text{if } Q_{pll\,max} \geq Q_{dsp\,min} \\ \text{error}, & \text{otherwise} \end{cases}.$$ Equation (5)

In some examples, integers in the range ($Q_{min}$, $Q_{max}$) are inserted into QARR based on the DCM preference. For a non-automatic mode (e.g., when the DCM is selected by the user), QARR is constructed by selecting values that are multiples of the DCM for the $Q_{min}$ to $Q_{max}$ range as follows:

$$Q_{start} = DCM * \left\lceil \frac{Q_{min}}{DCM} \right\rceil,$$ Equation (6)

and $$QARR = Q_{start} : DCM : Q_{max}.$$ Equation (7)

If DCM is set to automatic (where higher values of DCM are preferred over lower values), QARR is arranged such that Q values that satisfy DCM=4 are placed first (i.e., at a lower index), followed by the Q values that satisfy DCM=2, followed by the Q values that satisfy DCM=1 as follows:

$$Q_{4start} = 4 * \left\lceil \frac{Q_{min}}{4} \right\rceil, \quad \text{Equation (8)}$$

$$Q_{2start} = \min\left(2 * \left\lceil \frac{Q_{min}}{2} \right\rceil, Q_{4start} + 2\right), \quad \text{Equation (9)}$$

$$Q_{1start} = \min(Q_{min}, Q_{2start} + 1, Q_{4start} + 1), \quad \text{Equation (10)}$$

$$Q_{1arr} = [Q_{1start} : 2 : Q_{max}], \quad \text{Equation (11)}$$

$$Q_{2arr} = [Q_{2start} : 4 : Q_{max}], \text{ and} \quad \text{Equation (12)}$$

$$Q_{4arr} = [Q_{4start} : 4 : Q_{max}]. \quad \text{Equation (13)}$$

In some examples, once $Q_{1arr}$, $Q_{2arr}$, and $Q_{4arr}$ are obtained, QARR may be constructed by concatenating the three arrays in the order that yields the best SNR as follows:

$$Q_{arr} = [Q_{4arr}, Q_{2arr}, Q_{1arr}]. \quad \text{Equation (14)}$$

The IDSA is a search algorithm that narrows the search space of pre-divider (P) values and then searches through this space to find the appropriate P value and associated multiplier (J). Various equations are included here to show the relationship between $MOD_{clk}$ and $ROOT_{CLK}$, and valid J and P values connecting the two.

$$PLL_{Input} = \frac{\text{Root}_{clk}}{P}, \quad \text{Equation (15)}$$

$$PLL_{Output} = J * PLL_{Input},$$

$$MOD_{clk} = PLL_{Output}/N, \text{ and thus}$$

$$\frac{J * \text{Root}_{clk}}{P * N} = MOD_{clk}.$$

Dividing Equation 15 by $FS_{main}$ on both sides yields:

$$\frac{J * (\text{Root}_{clk}/FS_{main})}{P * N} = (MOD_{clk}/FS_{main}),$$

$$\frac{J * R_{rfs}}{P * Q} = OSR, \text{ and thus}$$

$$P = \frac{J * R_{rfs}}{Q * OSR}.$$

The common factors of $R_{rfs}$ and OSR can be eliminated by taking the greatest common divisor of the two, resulting in:

$$P = \frac{J * K_r}{Q * K_m},$$

In some examples, Km and Kr are obtained by integer division defined by the greatest common denominator (GCD) as follows:

$$K_r = R_{rfs}/GCD(OSR, R_{rfs}), \text{ and}$$

$$K_m = OSR/GCD(OSR, R_{rfs}).$$

In some examples, GCD and integer division are applied a second time to obtain $L_Q$ and $L_r$ as follows:

$$L_Q = Q/GCD(Q, K_r), \text{ and}$$

$$L_r = K_r/GCD(Q, K_r).$$

Based on the above, J can be simplified as follows:

$$J = \frac{P}{L_r} * K_m * L_Q. \quad \text{Equation (16)}$$

For J to be an integer in Equation 16, P has to be multiple of $L_r$. This follows from the fact that $K_m$ and $L_Q$ have no common factors with $L_r$. This result narrows the search space of P by $L_r$. Once an appropriate multiple has been found that meets the PLL input criterion, the same multiple of $K_m * L_Q$ is the value of J.

Figure 8:
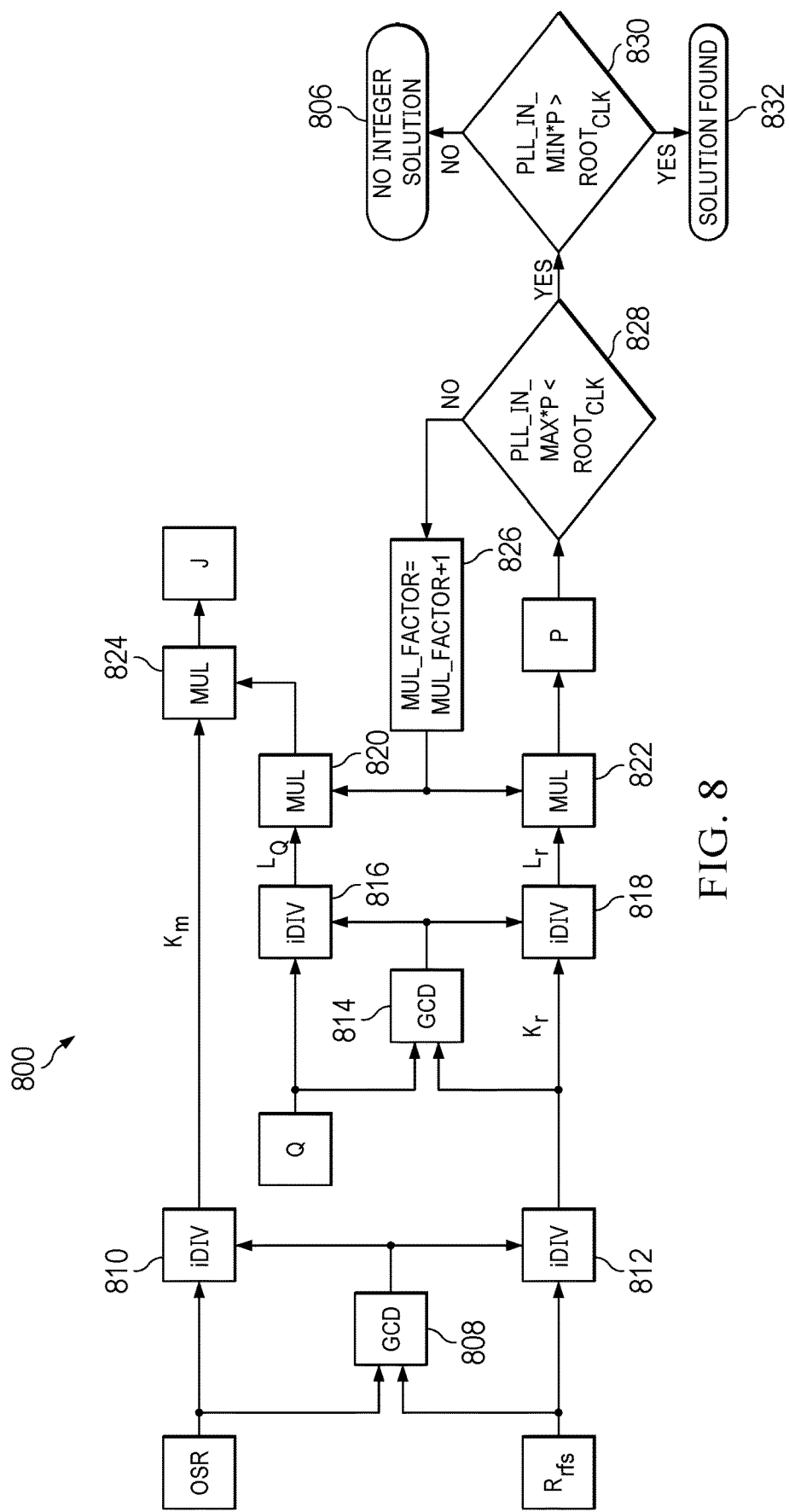
FIG. 8 is a diagram showing an example method for an integer divider search algorithm (IDSA).

FIG. 8 is a diagram showing an example method 800 for an IDSA. For example, the method 800 is part of the clock tree search algorithm 122 of FIGS. 1 and 4. In the method 800 various values are assumed to be predetermined, including OSR and $R_{rfs}$. For example, OSR may be previously determined based on Equation 3 (e.g., OSR is a function of c, $FS_{main}$, and $MOD_{clk}$). Also, $R_{rfs}$ (the ratio of the root clock to frame sync clock) may be previously determined using the root clock frequency and the frame sync clock frequency determined by a setting detection circuit such as the setting detection circuit 110 in FIG. 1, the clock frequency/ratio detector 404 in FIG. 4, the clock frequency/ratio detector 404A in FIG. 5A, or the clock frequency/ratio detector 404B in FIG. 5B.

As shown, the method 800 includes determining the GCD of OSR and Rrfs using the GCD block 808. The GCD of OSR and Rrfs is used to set the divider values for the divider blocks 810 and 812. As shown, the resulting output of the divider block 810 is $K_m$, while the resulting output of the divider block 812 is $K_r$. Q and $K_r$ are provided to the GCD block 814. The GCD block 814 determines the GCD of N and $K_r$ to set the divider values for the divider blocks 816 and 818. The resulting output of the divider block 816 is $L_Q$, while the resulting output of the divider block 818 is $L_r$. $L_Q$ is provided to the multiplier block 820, while $L_r$ is provided to the multiplier block 822. The multiplier value for the multiplier blocks 820 and 822 is selected by factor selection block 826, which starts at a multiplication factor (MUL_FACTOR) of 1 and increases the factor by 1 for each iteration. The output of the multiplier block 820 is used to select the multiplier value applied to $K_m$ by the multiplier block 824. The resulting output of the multiplier block 824 is J. Meanwhile, the output of the multiplier block 822 is P. If PLL_IN_MAX*P is less than $ROOT_{CLK}$ (block 828) and PLL_IN_MIN*P is greater than $ROOT_{CLK}$ (block 830), the method 800 has found an integer solution (block 832). Here, PLL_IN_MAX is a maximum PLL input frequency and PLL_IN_MIN is a minimum PLL input frequency. If PLL_IN_MAX*P is not less than $ROOT_{CLK}$ (block 828), the factor selection block 826 increments MUL_FACTOR by one, which changes the multiplier values used by the multiplier block 820 and 822 (J and P will be changed accordingly). If PLL_IN_MIN*P is not greater than $ROOT_{CLK}$, the method 800 ends with no integer solution found (block 806. In such case, a failure may be reported (if only integer solutions are allowed), or a fractional mode is used to compute J, D, and P as in method 700.

Without limitation, the described adaptive clock generator circuitry (e.g., the adaptive clock generator circuitry 106 in FIG. 1, the adaptive clock generator circuitry 106A in FIG. 2, the adaptive clock generator circuitry 106B in FIG. 4) and related methods are beneficial in data converter systems having a Continuous-Time Delta Sigma Modulation (CT-DSM) architecture. This is due to CT-DSM systems having very strict constraints on the modulator frequency. In one example data converter system, the modulator clock may run at 3.072 MHz with only 5% tolerance. Because of such constraints, most CT-DSM systems support only a limited set of sampling frequencies and ratios on their interfaces. In one approach, the clock-generator parameters for a limited set of supported modes are stored in a Look-up Table (LUT) and loaded during start-up. However, digital audio storage and playback use a plethora of sampling rates. Audio and audio-adjacent systems (e.g., test and measurement systems, ultrasonic systems, etc.) are very diverse and ICs catering to these markets may support a wide range of sampling rates (3 kHz-768 kHz) and clock ratios. The LUT approach is infeasible for such products as it results in a significant increase in IC area and cost. The computational approach of the adaptive clock generator circuitry described herein has a fixed cost and does not scale with the number of ratios or sample-rates that are supported.

Without limitation, other benefits of the described computational approach include the adaptive clock generator execution being nearly imperceptible (e.g., the interface settings detection, the search for an optimal solution and the subsequent clock tree configuration are done with no or minimal impact to the start-up time). The primary bottleneck in achieving a fast boot time is the execution time of the clock tree search algorithm (e.g., the clock tree search algorithm 122 in FIGS. 1 and 4). In some examples, the latency of the clock tree search algorithm is limited (e.g., a run time <1 ms) so as to be within a target start-up time. In general, optimization algorithms (e.g., algorithms that find an optimal solution for a given set of constraints) are computationally complex. When coupled with a target start-up time, a higher load on the clock frequency used to run an optimization algorithm is expected. Also, the clock used to run an optimization algorithm may be provided from an external clock source.

In some examples, the computational approach for the adaptive clock generator circuitry described herein has no dependency on an external clock. Instead, a low-frequency internal oscillator clock is re-purposed using an available clock generator resource (e.g., the PLL), to increase the internal oscillator frequency multi-fold. This decreases the execution time of the clock tree search algorithm significantly to finish execution within the target start-up time.

In some examples, there is a limit on the highest frequency external clock that can be provided. Such limitations may be due to input/output (I/O) buffer support, board-routing, and electromagnetic interference (EMI). As a result, achieving a low latency search algorithm is a challenge. The "bootstrapped" use of available clock generator resources to swiftly execute a computationally-intensive search algorithm solves this challenge.

In some examples, the adaptive clock generator circuitry is used with a circuit with adjustable interface settings. In response to such adjustments (e.g., triggered by different operating modes or user input), the adaptive clock generator circuitry is able to update the resource configuration parameters determined by the clock tree search algorithm.

In some examples, the clock tree search algorithm applies constraints dynamically based on the operating mode and user settings. In one example, if a primary interface is disabled, the clock tree search algorithm considers only the secondary interface constraints. In another example, PLL constraints are not considered if a user prefers that the PLL be disabled. In some examples, the clock tree search algorithm is a constrained integer programming algorithm (e.g., the solution may be limited to a set of integers) that is run on a low-resource fixed-point DSP without hardware stack support. In some examples, the clock tree search algorithm is executed without any dedicated hardware or memories. Instead, an available DSP and device memories are re-purposed at boot time to run the clock tree search algorithm.

In some examples, the clock tree search algorithm uses a two-step approach. The first step of the clock tree search algorithm is a reduction of search-space using a preference encoder. The preference encoder is configured to: 1) create an ordered set of integers that encodes the valid PLL output frequencies that satisfy constraints corresponding to a partial set of constraints that include the DSP MIPS (millions of instructions per second) rate, DEM clock preferences, power modes, PLL maximum constraints, etc.; 2) prioritize the ordered set of integers so that higher preference options are placed before lower preference options; and 3) prioritize the ordered set of integers so that lower power options are placed before higher power options. The second step of the clock tree search algorithm involves finding integer factors for the ordered values that satisfy the PLL input constraints. These integer factors are easily mapped to the P and J, where D is set to zero.

There are scenarios where an integer solution does not exist. For example, if user settings run the DSP at a very high clock rate (MIPS) that is not supported by the design and/or the interface clock frequencies are such that integer solutions do not exist. In such situations, the adaptive clock generator circuitry is configured to provide a clock-error indicator that identifies the nature of the failure. In some examples, this information enables upstream software to suggest remedial changes to the device settings to mitigate the failure.

In some examples, the setting detection circuit (e.g., the setting detection circuit 110 in FIG. 1, the clock frequency/ratio detector circuit 404 in FIG. 4, the clock frequency/ratio detector circuit 404A in FIG. 5A, or the clock frequency/ratio detector circuit 404B in FIG. 5B) used with the adaptive clock generator circuitry includes an interface clock frequency and ratio detector configured to detect the frame clock frequency bin and the ratio of the root clock to frame clock of a serial interface. When multiple serial interfaces are present, the setting detection circuit computes the frame clock frequency bin and the ratio of the root clock to frame clock of every serial interface. In some examples, an arbiter (e.g., the detection arbiter circuit 530 in FIG. 5B) is used to re-purpose the resources of a single detector to performing setting detection for multiple serial interfaces.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other examples, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described examples, and other examples are possible, within the scope of the claims.

What is claimed is:

1. An electronic circuit comprising:
digital circuits, each digital circuit of the digital circuits having a respective clock input; and
adaptive clock generator circuitry having generator clock outputs, each respective clock input coupled to one of the generator clock outputs, and the adaptive clock generator circuitry including:
a processor having an input interface and an output interface, the processor configured to provide resource configuration parameters at the output interface in response to clock settings received at the input interface and target settings; and
clock generator resources having a control input, a root clock input, and resource clock outputs, the control input coupled to the output interface, each resource clock output of the resource clock outputs coupled to a respective generator clock output of the generator clock outputs, and the clock generator resources configured to provide a respective clock signal at each of the resource clock outputs in response to the resource configuration parameters received at the control input, wherein the control input is a first control input, and the adaptive clock generator circuitry includes a setting detection circuit having second and third control inputs and first and second setting outputs, the setting detection circuit configured to provide clock settings at the first and second setting outputs responsive to control signals received at the second and third control inputs.

2. The electronic circuit of claim 1, wherein the control signals include an interface clock signal and a root clock signal and the clock settings include a root clock frequency, an interface clock frequency, a frame sync clock frequency, and a root clock to frame sync clock ratio.

3. The electronic circuit of claim 1, wherein the target settings include a modulation clock constraint, a dynamic-element matching clock constraint, a phase-locked loop (PLL) input clock constraint, a PLL output clock constraint, and an integer/fractional mode setting.

4. The electronic circuit of claim 1, wherein the processor is a digital signal processor configured to perform digital filtering operations and execute a clock tree search algorithm to determine the resource configuration parameters based on a target latency, an internal clock, and an available clock generator resource of the clock generator resources.

5. The electronic circuit of claim 4, wherein the clock tree search algorithm is based on search-space reduction, search-space ordering, and search iterations that follow the search-space ordering.

6. An electronic circuit comprising:
digital circuits, each digital circuit of the digital circuits having a respective clock input; and
adaptive clock generator circuitry having generator clock outputs, each respective clock input coupled to one of the generator clock outputs, and the adaptive clock generator circuitry including:
a processor having an input interface and an output interface, the processor configured to provide resource configuration parameters at the output interface in response to clock settings received at the input interface and target settings; and
clock generator resources having a control input, a root clock input, and resource clock outputs, the control input coupled to the output interface, each resource clock output of the resource clock outputs coupled to a respective generator clock output of the generator clock outputs, and the clock generator resources configured to provide a respective clock signal at each of the resource clock outputs in response to the resource configuration parameters received at the control input, wherein the clock generator resources include a phase-locked loop (PLL), a pre-PLL divider, analog-to-digital converter (ADC) dividers, digital-to-analog converter (DAC) dividers, digital signal processor (DSP) dividers, and communication interface dividers.

7. The electronic circuit of claim 6, wherein the control input is a first control input, and the adaptive clock generator circuitry includes a setting detection circuit having second and third control inputs and first and second setting outputs, the setting detection circuit configured to provide clock settings at the first and second setting outputs responsive to control signals received at the second and third control inputs.

8. An electronic circuit comprising:
digital circuits, each digital circuit of the digital circuits having a respective clock input; and
adaptive clock generator circuitry having generator clock outputs, each respective clock input coupled to one of the generator clock outputs, and the adaptive clock generator circuitry including:
a processor having an input interface and an output interface, the processor configured to provide resource configuration parameters at the output interface in response to clock settings received at the input interface and target settings; and
clock generator resources having a control input, a root clock input, and resource clock outputs, the control input coupled to the output interface, each resource clock output of the resource clock outputs coupled to a respective generator clock output of the generator clock outputs, and the clock generator resources configured to provide a respective clock signal at each of the resource clock outputs in response to the resource configuration parameters received at the control input, wherein the digital circuits include a digital audio serial interface (ASI) configurable as a primary ASI or a secondary ASI, and the target settings include primary ASI settings or secondary ASI settings.

9. A method comprising:
obtaining, by adaptive clock generator circuitry, interface clock settings;
obtaining, by the adaptive clock generator circuitry, root clock settings;
obtaining, by the adaptive clock generator circuitry, target settings;
determining, by the adaptive clock generator circuitry, resource configuration parameters responsive to the interface clock settings, the root clock settings, and the target settings; and
generating, by the adaptive clock generator circuitry, clock signals responsive to the determined resource configuration parameters, wherein obtaining the interface clock settings includes:
receiving an interface clock signal;
determining the interface clock settings based on the received interface clock signal, the interface clock settings including an interface clock frequency and an interface clock bin;
receiving a root clock signal; and
determining the root clock settings based on the received root clock signal, the root clock settings including a root clock frequency and a root clock to frame sync clock ratio.

10. The method of claim 9, wherein obtaining the target settings include obtaining a modulation clock constraint, a dynamic-element matching clock constraint, a phase-locked loop (PLL) input clock constraint, a PLL output clock constraint, and an integer/fractional mode setting.

11. The method of claim 9, wherein determining the resource configuration parameters include determining a pre-phase-locked loop (pre-PLL) divider value, an analog-to-digital converter (ADC) divider value, a digital-to-analog converter (DAC) divider value, a digital signal processor (DSP) divider value, and a communication interface divider value.

12. The method of claim 9, wherein generating the clock signals includes generating an analog-to-digital converter (ADC) clock signal, a digital signal processor (DSP) clock signal, a digital-to-analog converter (DAC) clock signal, and a communication interface clock signal.

13. A method comprising:
obtaining, by adaptive clock generator circuitry, interface clock settings;
obtaining, by the adaptive clock generator circuitry, root clock settings;
obtaining, by the adaptive clock generator circuitry, target settings;
determining, by the adaptive clock generator circuitry, resource configuration parameters responsive to the interface clock settings, the root clock settings, and the target settings;
generating, by the adaptive clock generator circuitry, clock signals responsive to the determined resource configuration parameters; and
using a clock tree search algorithm to determine the resource configuration parameters, the clock tree search algorithm based on search-space reduction, search-space ordering, and search iterations that follow the search-space ordering.

14. The method of claim 13, wherein obtaining the interface clock settings includes:
receiving an interface clock signal;
determining the interface clock settings based on the received interface clock signal, the interface clock settings including an interface clock frequency and an interface clock bin;
receiving a root clock signal; and
determining the root clock settings based on the received root clock signal, the root clock settings including a root clock frequency and a root clock to frame sync clock ratio.

15. A codec circuit comprising:
clocked components including a processor; and
clock generator resources coupled to the processor, wherein the clock generator resources are configured to generate clock signals for the clock components responsive to resource configuration parameters, and the processor is configured to:
receive clock settings and target settings; and
execute a clock tree search algorithm to determine the resource configuration parameters, the clock tree search algorithm responsive to the clock settings and the target settings, wherein the processor is a digital signal processor (DSP) configured to perform digital filtering operations, and the clock generator resources include a phase-locked loop (PLL), a pre- PLL divider, an analog-to-digital converter (ADC) divider, a digital-to-analog converter (DAC) divider, a DSP divider, and a communication interface divider.

16. The codec circuit of claim 15, further comprising a setting detection circuit coupled to the processor and configured to:
    receive an interface clock signal;
    receive a root clock signal;
    determine the clock settings responsive to the received interface clock signal and the root clock signal, the clock settings including an interface clock frequency, an interface clock bin, root clock frequency, and a root clock to frame sync clock ratio; and
    provide the clock settings to the processor.

17. The codec circuit of claim 16, wherein the processor is a digital signal processor (DSP) configured to perform digital filtering operations, and the clock generator resources include a phase-locked loop (PLL), a pre-PLL divider, an analog-to-digital converter (ADC) divider, a digital-to-analog converter (DAC) divider, a DSP divider, and a communication interface divider.

18. The codec circuit of claim 15, wherein the clock tree search algorithm is based on search-space reduction, search-space ordering, and search iterations that follow the search-space ordering.

19. The codec circuit of claim 15, wherein the target settings include a modulation clock constraint, a dynamic-element matching clock constraint, a phase-locked loop (PLL) input clock constraint, and a PLL output clock constraint.

20. The codec circuit of claim 15, wherein the clocked components include a digital audio serial interface (ASI) configurable as a primary ASI or a secondary ASI, and the target settings include primary ASI settings or secondary ASI settings.

* * * * *